United States Patent
Abusorrah et al.

(10) Patent No.: US 12,311,560 B2
(45) Date of Patent: May 27, 2025

(54) SYSTEM AND METHODS FOR MULTI-ROBOTIC MULTI-PRODUCT U-SHAPED DISASSEMBLY LINE

(71) Applicant: King Abdulaziz University, Jeddah (SA)

(72) Inventors: Abdullah Abusorrah, Jeddah (SA); Hesham Alhumade, Jeddah (SA); Muhyaddin Rawa, Jeddah (SA); Yusuf Al-Turki, Jeddah (SA); Ahmed Alabdulwahab, Jeddah (SA); Aiiad Albeshri, Jeddah (SA); Xi Wang Guo, Jeddah (SA); Khaled Sedraoui, Jeddah (SA); MengChu Zhou, Jeddah (SA)

(73) Assignee: King Abdulaziz University, Jeddah (SA)

( * ) Notice: Subject to any disclaimer, the term of this patent is extended or adjusted under 35 U.S.C. 154(b) by 335 days.

(21) Appl. No.: 18/168,220

(22) Filed: Feb. 13, 2023

(65) Prior Publication Data
US 2024/0165813 A1    May 23, 2024

Related U.S. Application Data

(60) Provisional application No. 63/427,299, filed on Nov. 22, 2022.

(51) Int. Cl.
*B25J 9/16* (2006.01)
*B25J 9/00* (2006.01)
*B25J 13/00* (2006.01)

(52) U.S. Cl.
CPC .......... *B25J 9/1682* (2013.01); *B25J 9/0093* (2013.01); *B25J 9/161* (2013.01); *B25J 9/163* (2013.01); *B25J 13/006* (2013.01)

(58) Field of Classification Search
None
See application file for complete search history.

(56) References Cited

U.S. PATENT DOCUMENTS

| 2020/0195101 A1* | 6/2020 | McIntyre | B25J 9/163 |
| 2023/0142682 A1* | 5/2023 | Li | B23Q 7/04 |
| | | | 414/589 |

FOREIGN PATENT DOCUMENTS

| CN | 111860990 A | 10/2020 |
| CN | 112605988 B | 11/2021 |

OTHER PUBLICATIONS

Christopher Roser, Line Layout Strategies—Part 2: I-, U-, S-, and L-Lines Accessed through https://www.allaboutlean.com/line-layout-i-s-u-l-lines/ on Feb. 25, 2025 (Year: 2016).*

(Continued)

*Primary Examiner* — Kyle T Johnson
*Assistant Examiner* — Arslan Azhar
(74) *Attorney, Agent, or Firm* — Oblon, McClelland, Maier & Neustadt, L.L.P.

(57) ABSTRACT

A multi-robotic U-shaped disassembly line, a method for disassembling components on the multi-robotic U-shaped disassembly line, and a non-transitory computer readable medium that cause one or more processors to perform the method for disassembling components on the multi-robotic U-shaped disassembly line are provided. The multi-robotic U-shaped disassembly line uses multiple robots, assigned to multiple workstations to perform disassembly tasks without precedence and conflict relationships, so that different types of end-of-life products can be disassembled. A mathematical model is established to maximize the disassembly profit and minimize the smoothness index for the multi-robotic U-shaped disassembly line. An Improved Multi-objective Discrete Brainstorming Optimization (IMDBO) algorithm is (Continued)

utilized to identify improvements for the multi-robotic U-shaped disassembly line.

20 Claims, 21 Drawing Sheets

(56) References Cited

OTHER PUBLICATIONS

Hao Ming, Multi-Robotic Disassembly Line Balancing with Uncertain Processing Time, 11th CIRP Conference on Industrial Product-Service Systems, 2019 (Year: 2019).*

Kun Wu, et al., "Multi-objective Discrete Brainstorming Optimizer for Multiple-product Partial U-shaped Disassembly Line Balancing Problem", IEEE 33rd Chinese Control and Decision Conference (CCDC), May 22-24, 2021, pp. 305-310.

GuiBin Qin, et al., "Multi-objective Discrete Migrating Birds Optimizer Solving Multiple-product Partial U-shaped Disassembly Line Balancing Problem", IEEE 29th Mediterranean Conference on Control and Automation (MED), Jun. 22-25, 2021, 3 pages (Abstract only).

Ze-qiang Zhang, et al., "Optimization of parallel disassembly line balancing problem with different operators between workstations", Journal of Zhejiang University (Engineering Science), vol. 55, No. 10, Oct. 2021, pp. 1795-1805 (with English Abstract).

* cited by examiner

SYSTEM AND METHODS FOR MULTI-ROBOTIC MULTI-PRODUCT U-SHAPED DISASSEMBLY LINE

CROSS REFERENCE TO RELATED APPLICATIONS

The present application claims the benefit of priority to U.S. Prov. App. No. 63/427,299 entitled "Multi-Robotic Multi-Product U-Shaped Disassembly-Line-Balancing System With Improved Multi-Objective Discrete Brainstorming Optimization Algorithm", filed on Nov. 22, 2022, and incorporated herein by reference in its entirety.

STATEMENT OF ACKNOWLEDGEMENT

The inventors acknowledge the financial support provided by the Deputyship for Research & Innovation, Ministry of Education, Saudi Arabia through the Project #IFPNC001135-2020 and from King Abdulaziz University, DSR, Jeddah, Saudi Arabia.

BACKGROUND

Technical Field

The present disclosure is directed to large-scale automated disassembly of end-of-life products, and particularly to a multi-robotic U-shaped disassembly line and a method for disassembling components on the multi-robotic U-shaped disassembly line.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

End-of-life (EOL) products are products that have reached the end of their useful life and are no longer being manufactured or sold. As more and more products are being produced, the number of EOL products that need environmentally safe disposal is also increasing. One of the main problems with the disposal of EOL products is that they can contain hazardous materials that can be harmful to the environment and to human health if not handled properly. These materials may include batteries, chemicals, and other toxic substances that can leak out of the product. In recent decades, with the continuous decrease in product life cycles, the number of EOL products is increasing, which can put a strain on waste management systems. Improper disposal of EOL products not only wastes resources but can also cause environmental pollution (See: Z. Li, I. Kucukkoc and Z. Zhang, "*Iterated local search method and mathematical model for sequence-dependent U-shaped disassembly line balancing problem*", Comput. Ind. Eng., 2019). Therefore, it is important to properly dispose of EOL products in order to protect the environment and public health, as well as to preserve valuable resources.

Disassembly is an essential and critical step in the handling of EOL products. Disassembly is the process of breaking down a product into its individual components in order to facilitate repair, refurbishment, or recycling. In the context of the disposal of EOL products, disassembly can play an important role in helping to reduce waste and recover valuable resources. One of the main benefits of disassembling EOL products is that it allows for the recovery of valuable materials that can be used to create new products. Many EOL products contain materials such as metals, plastics, and electronics that can be recovered and recycled, and disassembly can make it easier to access and separate these materials for recycling. Disassembly can also help to reduce the volume of waste that needs disposal, as it allows for the reuse of parts and components rather than sending them to a landfill. This can help to reduce the environmental impact of waste and can be a more sustainable approach to product disposal. The recovered parts from the disassembly process can be used in remanufacturing, which is a comprehensive and rigorous industrial process by which a previously sold, leased, used, worn, remanufactured, or non-functional product or part is returned to a like-new, same-as-when-new, or better-than-when-new condition from both a quality and performance perspective, through a controlled, reproducible, and sustainable process.

A disassembly line is suitable for use in recycling/remanufacturing industry because of its high productivity and a high degree of automation. In the modern industrial environment, the disassembly line may play an extremely important role in recycling EOL products and resource reuse. The main purpose of disassembly line for EOL products is to efficiently and effectively break down the products into their component parts. To reduce the disassembly time and improve the line balance, the design of the disassembly line is particularly significant. Disassembly lines can vary in size and complexity, depending on the types of EOL products being disassembled and the end goal of the disassembly process. For instance, different products may have different components, materials, and construction techniques, and the disassembly line will need to be able to effectively break down these products into their individual parts. Due to the complexities of EOL products, disassembly, even with a disassembly line, has traditionally been done manually. (See: J. Y. Liu, Z. D. Zhou, D. T. Pham, W. J. Xu, C. Q. Ji, and Q. Liu, "*Collaborative optimization of robotic disassembly sequence planning and robotic disassembly line balancing problem using improved discrete Bees algorithm in remanufacturing*," Robot. CIM-INT. Manuf, 2020). However, manual disassembly has low efficiency and a high labor cost. To reduce labor costs, attention has been directed to robotic disassembly, which has high efficiency and low labor cost. (See: S. Vongbunyong, S. Kara, and M. Pagnucco, "*Basic behaviour control of the vision-based cognitive robotic disassembly automation*", Assembly Autom., vol. 33, no. 1, pp. 38-56, 2013; S. Vongbunyong, S. Kara, and M. Pagnucco, "*Application of cognitive robotics in disassembly of products*", CIRP Ann. Manuf Technol., vol. 62, no. 1, pp. 31-34, 2013; both incorporated herein by reference in their entirety). Further, compared with a manual disassembly line, a robotic disassembly line is not particularly affected by workload. Overall for efficiency and scaling operations for the handling of EOL products, an automated general-purpose disassembly line is needed which is flexible and adaptable to changing product mix to handle a wide range of EOL products, including products with different sizes, shapes, and materials.

Disassembly line balancing is the process of determining the most efficient and effective way to allocate tasks and resources in a disassembly line in order to maximize efficiency and minimize waste. Factors such as product complexity, product mix, resource constraints, and quality and reliability can all impact the ability to balance the disassembly line effectively, which is referred to as the disassembly line balancing problem (DLBP). For EOL products, the DLBP refers to the challenge of designing a disassembly line that is efficient and effective in breaking down the products into their individual parts. DLBP has attracted extensive attention from academic and practical circles. McGovern and Gupta (See: S. M. McGovern and S. M. Gupta, "*A balancing method and genetic algorithm for disassembly line balancing*," Eur. J. Oper. Res., vol. 179 no. 3, pp. 692-708, 2007; incorporated herein by reference in its entirety), mathematically defined DLBP to minimize the number of workstations and the idle time between workstations. It was defined as an NP-complete problem and a genetic algorithm was proposed for its solution. Further, Kalayci and Gupta proposed an ant colony optimization algorithm considering the sequence-dependent time increment in DLBP, which is based on minimizing the number of workstations, idle time of workstations and risks. (See: C. B. Kalayci and S. M. Gupta, "*Ant colony optimization for sequence-dependent disassembly line balancing problem*," J. Manuf Technol. Mana., vol. 24, no. 3, pp. 413-427, 2013, incorporated herein by reference in its entirety). Pistolesi et al. (See: F. Pistolesi, B. Lazzerini, M. D. Mura, and G. Dini, "*EMOGA: a hybridgenetic algorithm with extremal optimization core for multiobjective disassembly line balancing*," IEEE Trans. Ind. Inform., vol. 14 no. 3, pp. 1089-1098, 2018; incorporated herein by reference in its entirety) minimized the number of workstations, maximized the total profit and the number of tasks in DLBP. An extreme multi-objective genetic algorithm was written to solve the optimization problem. Mete et al. (See: S. Mete, Z. A. Çil, K. Ağpak, E. Özceylan, and A. Dolgui, "*A solution approach based on beam search algorithm for disassembly line balancing problem*," J. Manuf Syst., vol. 41, pp. 188-200, 2016; incorporated herein by reference in its entirety) proposed a DLBP solution based on a beam search to minimize the number of workstations. Zhang et al. (See: Z. Q. Zhang, K. P. Wang, L. X. Zhu, and Y. Wang, "*A Pareto improved artificial fish swarm algorithm for solving a multi-objective fuzzy disassembly line balancing problem*," Expert Syst. Appl., vol. 86, pp. 165-176, 2017; incorporated herein by reference in its entirety) studied DLBP with a fuzzy disassembly time and proposed an improved Pareto artificial fish swarm algorithm.

Further, some meta-heuristic algorithms have been devised to solve DLBP such as a particle swarm optimization algorithm (See: C. B. Kalayci and S. M. Gupta, "*A particle swarm optimization algorithm with neighborhood-based mutation for sequence-dependent disassembly line balancing problem*," Int. J. Adv. Manuf Technol., vol. 69, pp. 197-209, 2013; a genetic algorithm; (H. Jiang, J. J. Yi, S. L. Chen, and X. M. Zhu, "*A multi-objective algorithm for task scheduling and resource allocation in cloud-based disassembly*," J. Manuf Syst., vol. 41, pp. 239-255, 2016; an artificial bee colony algorithm. (Y. C. Gao, Q. R. Wang, Y. X. Feng, H. Zheng, B. Zheng, and J. R. Tan, "*An energy-saving optimization method of dynamic scheduling for disassembly line*," Energies, 2018; and an ant colony algorithm (S. Mete, Z. A. Çil, E. Özceylan, K. Ağpak, and O. Battaïa, "*An optimisation support for the design of hybrid production lines including assembly and disassembly tasks*," Int. J. Prod. Res., vol. 56, no. 24, pp. 7375-7389, 2018; each incorporated herein by reference in its entirety). Also, a brainstorming optimization algorithm (BOA), derived from the simulation of a human brainstorming conference process has been successfully applied in many fields. Alzaqebah et al. (See: M. Alzaqebah, S. Jawarneh, M. Alwohaibi, M. K. Alsmadi, I. Almarashdeh, and R. M. Mohammad, "*Hybrid brain storm optimization algorithm and late acceptance hill climbing to solve the flexible job-shop scheduling problem*," Journal of King Saud University—Computer and Information Sciences, 2020, in press; incorporated herein by reference in its entirety) presented the BOA as a solution to the flexible job-shop scheduling problem. Jordehi (See: A. R. Jordehi, "Brainstorm optimisation algorithm (BSOA): An efficient algorithm for finding optimal location and setting of FACTS devices in electric power systems," Int. J. Elec. Power, vol. 69, pp. 48-57, 2015; incorporated herein by reference in its entirety), applied the BOA to find the optimal location and setting of flexible AC transmission system devices. Mafteiu-Scai (See: L. O. Mafteiu-Scai, "*A new approach for solving equations systems inspired from brainstorming*," IJNCAA, vol. 5, no. 1, pp. 10-18, 2015 incorporated herein by reference in its entirety) proposed a metaheuristic inspired by BOA combined with concepts from graph theory for solving a system of equations.

Researchers have focused on the traditional linear disassembly line balancing problem of a single product. It may be appreciated that when multiple EOL products can be disassembled at the same time, the disassembly efficiency can be further improved. Fang et al. (See: Y. L. Fang, Q. Liu, M. Q. Li, Y. J. Laili, and D. T. Pham, "*Evolutionary many-objective optimization for mixed-model disassembly line balancing with workstations*," Eur. J. Oper. Res., vol. 276, no. 1, pp. 160-174, 2018, incorporated herein by reference in its entirety) proposed a mixed-model DLBP with workstations. Considering that the driving robot only a small amount of energy such as fuel or electricity, Fang et al. [Y. L. Fang, H. L. Xu, Q. Liu, and D. T. Pham, "*Evolutionary optimization using epsilon method for resource-constrained multi-robotic disassembly line balancing*," J. Manuf Syst., vol. 56, pp. 392-413, 2020, incorporated herein by reference in its entirety) focused on a resource-constrained multi-robotic DLBP. However, there are still some defects in the research of multi-robotic multi-product DLBP, which need to be further explored.

Furthermore, different from linear disassembly lines, U-shaped disassembly lines increase the possibility of assigning tasks to workstations in different combinations. A U-shaped disassembly line is more flexible and suitable for complex EOL product disassembly. Li et al. (See: Z. Li, I. Kucukkoc and Z. Zhang, "*Iterated local search method and mathematical model for sequence-dependent U-shaped disassembly line balancing problem*", Comput. Ind. Eng., 2019, incorporated herein by reference in its entirety) proposed a mixed-integer programming (MIP) model, studied the sequence-dependent U-shaped DLBP with multiple objectives, and designed an iterative local search algorithm to solve it. However, the MIP model often relies on simplifying assumptions about the problem being solved, such as linearity or convexity of the objective function; and these assumptions may not always hold in practice, which can limit the accuracy of the solutions generated by the model. Wang et al. (See: Y. F. Wang, Y. Xie, Y. P. Ren, and C. Y. Zhang, "*A MCDM-based meta-heuristic approach for U-shaped disassembly line balancing problem*", J. Phys. Conf Ser., 2021; incorporated herein by reference in its entirety) proposed a meta-heuristic algorithm including multi-criteria decision making and variable domain search to solve the U-shaped DLBP. However, the meta-heuristic algorithms can be computationally intensive to implement, particularly for large and complex problems. Agrawal et al. (See: S. Agrawal and M. K. Tiwari, "*A collaborative ant colony algorithm to stochastic mixed-model U-shaped dis-

*assembly line balancing and sequencing problem,*" Int. J. Prod. Res., vol. 46, no. 6, pp. 1405-1429, 2008; incorporated herein by reference in its entirety) proposed a stochastic mixed model for U-shaped DLBP. However, the stochastic mixed model can only take into account the uncertainties that are explicitly modeled in the problem formulation; and if there are other sources of uncertainty/randomness that are not accounted for, the solutions generated by the model may not be robust.

Each of the aforementioned references suffers from one or more drawbacks, including, but not limited to, limited accuracy, complexity, uncertainty, etc., hindering their adoption. Accordingly, it is one object of the present disclosure to provide a multi-robotic U-shaped disassembly line and a method for disassembling components on a multi-robotic U-shaped disassembly line for large-scale, automated disassembly of components which is efficient and maximizes disassembly profit and minimizes smoothness index.

SUMMARY

In an exemplary embodiment, a multi-robotic U-shaped disassembly line is provided. The multi-robotic U-shaped disassembly line includes a U-shaped conveyor belt including an entrance end and an exit end, an entrance portion at the entrance end, a first portion connected to the entrance portion, a curved portion connected to the entrance portion, a second portion connected between the curved portion and an exit portion of the U-shaped conveyor belt, wherein the entrance portion is configured to receive at least two components and the exit portion is configured to release disassembled parts of the at least two components. The multi-robotic U-shaped disassembly line further includes a plurality of robots. Each robot is configured to perform at least two disassembly tasks. The plurality of robots includes at least two robots. The multi-robotic U-shaped disassembly line further includes a plurality of workstations. Each workstation is located along at least one of the first portion and the second portion. Each workstation includes at least two robots. Each robot is configured to rotate about a central axis to perform at least one disassembly task on the first portion and one disassembly task on the second portion. The multi-robotic U-shaped disassembly line further includes a plurality of tools. Each workstation includes at least one tool. The multi-robotic U-shaped disassembly line further includes a user interface configured to receive an input of a component number. The multi-robotic U-shaped disassembly line further includes an internal database configured with records comprising a plurality of component numbers and constituent part numbers for each component number. The multi-robotic U-shaped disassembly line further includes a computing device connected to the U-shaped conveyor belt, to each robot, to the user interface and to the internal database. The computing device includes circuitry, at least one processor, and a memory comprising disassembly instructions for each component number. The at least one processor is configured to execute the disassembly instructions to receive, from the user interface, an input of a component number for each component located on the entrance portion of the U-shaped conveyor belt; retrieve, from the memory, at least one disassembly task for each component number; assign each disassembly task to a robot configured to perform the disassembly task; actuate the U-shaped conveyor belt to move the components past the workstations; and command each of the plurality of robots to use the at least one tool to perform at least one disassembly task upon at least one workstation as the components move to the workstation. The multi-robotic U-shaped disassembly line further includes a sorter configured to receive the disassembled parts of the at least two components from the exit portion.

In another exemplary embodiment, a method for disassembling components on a multi-robotic U-shaped disassembly line is provided. The method includes configuring an entrance portion of a U-shaped conveyor belt to receive at least two components. The method further includes disassembling the at least two components by at least two robots positioned at a plurality of workstations adjacent to the U-shaped conveyor belt. Each robot is configured to rotate about a central axis to perform at least one disassembly task at one side of the workstation on an entrance side of the U-shaped conveyor belt and one disassembly task on other side of the workstation at an exit side of the U-shaped conveyor belt. The method further includes configuring an exit portion of the U-shaped conveyor belt to release disassembled parts of the at least two components into a sorter.

In another exemplary embodiment, a non-transitory computer readable medium having disassembly instructions stored therein that, when executed by one or more processors, cause the one or more processors to perform a method for disassembling components on a multi-robotic U-shaped disassembly line. The method includes configuring an entrance portion of a U-shaped conveyor belt to receive at least two components. The method further includes disassembling the at least two components by at least two robots positioned at a plurality of workstations adjacent to the U-shaped conveyor belt. Each robot is configured to rotate about a central axis to perform at least one disassembly task at one side of the workstation adjacent to a first portion of the U-shaped conveyor belt connected between the entrance portion and a curved portion of the U-shaped conveyor belt and to perform at least one disassembly task on a second portion of the workstation adjacent to an exit portion of the U-shaped conveyor belt; and configuring an exit portion of the U-shaped conveyor belt to release disassembled parts of the at least two components into a sorter.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
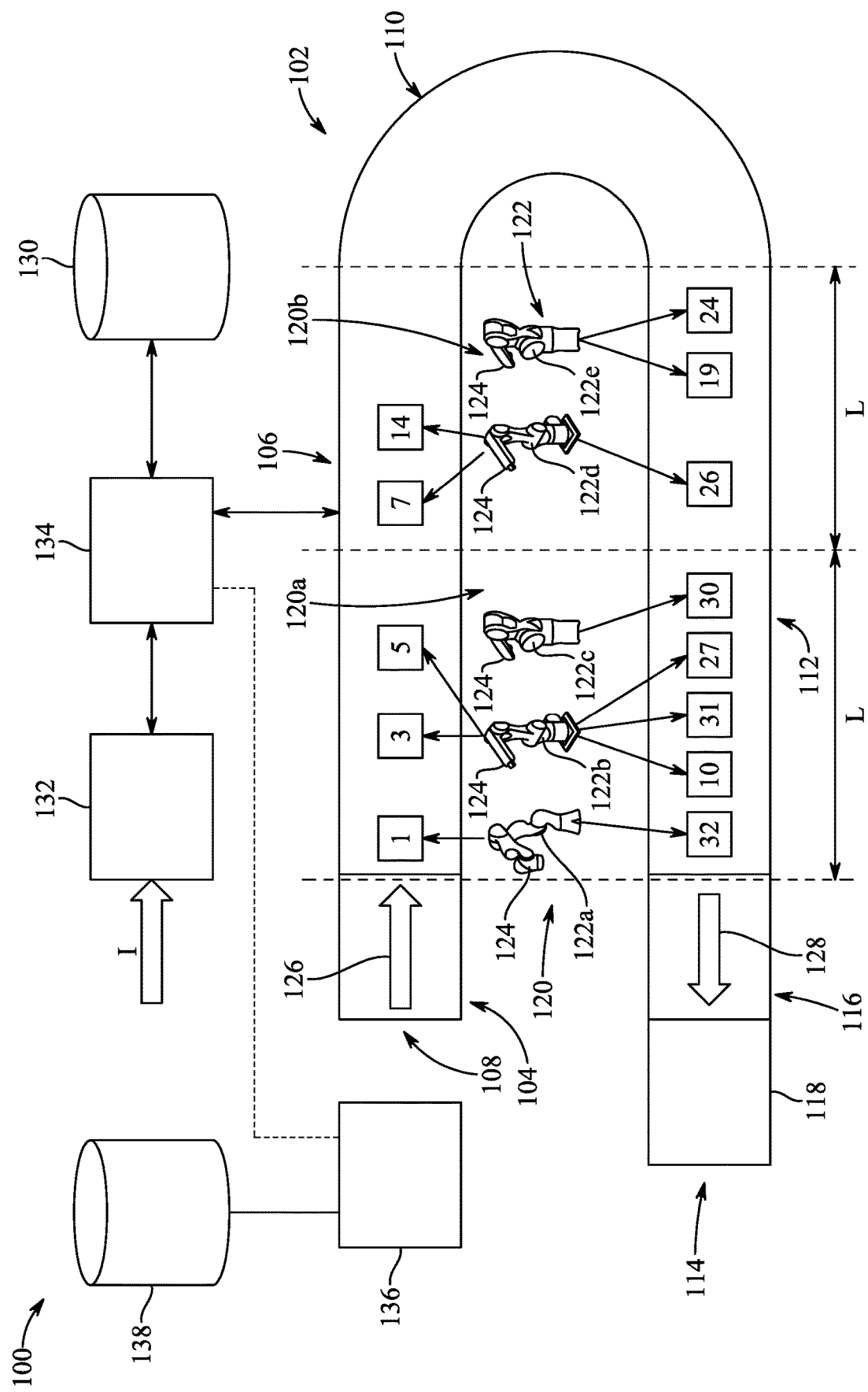
FIG. 1 is a schematic diagram of a multi-robotic U-shaped disassembly line, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a multi-robotic U-shaped disassembly line and a method for disassembling components on a multi-robotic U-shaped disassembly line. The multi-robotic U-shaped disassembly line, as used herein, implements a multi-robotic multi-product U-shaped disassembly line balancing (MMUD) system, with the two terms being interchangeably used hereinafter for purposes of the present disclosure. In the MMUD system, a set of tasks for different EOL products or subassemblies may be performed simultaneously by multiple robots.

By assigning multiple robots in a workstation to realize parallel disassembly tasks, the productivity is effectively improved, the workload of a workstation is balanced, and the idle time of a workstation is reduced. Aspects of the present disclosure include a mathematical model for the MMUD system. The MMUD system of the present disclosure is more practical than conventional systems and is particularly suitable for the complex multi-product disassembly industry. The present disclosure presents the MUD system and methods of operation. Aspects of the present disclosure further provide a mathematical formulation for the MMUD system. An improved multi-objective discrete brainstorming optimization (IMDBO) algorithm is used to control the MMUD system. The objective of the present disclosure with implementation of the MMUD system is to maximize a disassembly profit and minimize a smoothness index.

FIG. 1 illustrates a schematic of a multi-robotic U-shaped disassembly line (as represented by reference numeral 100). The multi-robotic U-shaped disassembly line 100 includes a U-shaped conveyor belt 102. As used herein, the U-shaped conveyor belt 102 is a type of conveyor belt that is shaped like a "U" when viewed from above. The U-shaped conveyor belt 102 includes an entrance end 108, an entrance portion 104 configured to receive components for disassembly, first portion 106 connected to the entrance portion 104, a curved portion 110, a second portion 112 connected to an exit portion 116 configured to receive the disassembled parts of the U-shaped conveyor belt 102. As shown, in the U-shaped conveyor belt 102, the entrance portion 104 and the exit portion 116 are adjacent across the center of the U-shaped conveyor belt 102. The multi-robotic U-shaped disassembly line 100 further includes an exit end 114 and a sorter 118 connected to the exit portion 116. It may be understood that during conventional disassembly in a linear disassembly line of some large components, such components may need to go back to a previous stage, thus there may arise a need to adjust the disassembly direction of the linear disassembly line during the disassembly operation. Compared with the conventional linear disassembly line, the U-shaped conveyor belt 102 with its 'U'-shape solves this problem by using robots which can perform disassembly tasks on either the first portion 106 or the second portion 112, and thus is more flexible and meets the needs of large-scale automatic disassembly plants.

The multi-robotic U-shaped disassembly line 100 also includes a plurality of workstations (as generally represented by reference numeral 120). Each workstation of the plurality of workstations 120 is located along at least one of the first portion 106 and the second portion 112 of the U-shaped conveyor belt 102. The multi-robotic U-shaped disassembly line 100 further includes a plurality of robots (as generally represented by reference numeral 122). In aspects of the present disclosure, the plurality of robots 122 includes at least two robots. In particular, each workstation of the plurality of workstations 120 includes at least two robots 122. In the illustration of FIG. 1, the multi-robotic U-shaped disassembly line 100 is shown to include two workstations, a first workstation 120*a* and a second workstation 120*b*. Further, the multi-robotic U-shaped disassembly line 100 is shown to have the first workstation 120*a* including three robots, a first robot 122*a*, a second robot 122*b* and a third robot 122*c*; and the second workstation 120*b* including two robots, a fourth robot 122*d* and a fifth robot 122*e*. It may be noted that, in the present examples, the multi-robotic U-shaped disassembly line 100 uses three types of robots, with the first robot 122*a* being of 'Robot Type 3', the second robot 122*b* and the fourth robot 122*d* being of 'Robot Type 2', and the third robot 122*c* and the fifth robot 122*e* being of 'Robot Type 1'. It may be appreciated that the given number of workstations 120 and the given number of robots 122 in any one of the workstations 120, as well as the given arrangement of types of robots 122, is exemplary only and may vary depending on requirements of the multi-robotic U-shaped disassembly line 100 and the types of products being disassembled. The multi-robotic U-shaped disassembly line 100 further includes a plurality of tools (as generally represented by reference numeral 126), such as disassembly tools. Herein, each workstation of the plurality of workstations 120 includes at least one tool 124. It may be understood that the robots 122 may implement the tools 124 for performing the respective one or more disassembly tasks.

As discussed, the multi-robotic U-shaped disassembly line 100 of the present disclosure is implemented for disassembly operations. In the multi-robotic U-shaped disassembly line 100, the entrance 104 of the U-shaped conveyor belt 102 is configured to receive at least two components (as indicated by an arrow 126, and also sometimes referred to as "product 126") and the exit portion 116 is configured to release disassembled parts (as indicated by an arrow 128, and also sometimes referred to as "parts 128" or "component parts 128") of the at least two components 126. Herein, the sorter 118 is configured to receive the disassembled parts 128 of the at least two components from the exit portion 116. With the entrance portion 104 and the exit portion 116 (as well as the sorter 118) being on the same side of the U-shaped conveyor belt 102, the entrance of the at least two components 126 to be disassembled and the exit of the disassembled parts 128 are also on the same side, which, as may be appreciated, can reduce the logistics cost. Herein, each of the plurality of workstations 120 provides a designated area for the corresponding one or more of the plurality of robots 122 to perform their designated tasks and contribute to the overall operation of the multi-robotic U-shaped disassembly line 100. In aspects of the present disclosure, each robot of the plurality of robots 122 is configured to perform at least two disassembly tasks (as discussed later in more detail). Specifically, each robot of the plurality of robots 122 is configured to rotate about a central axis to perform at least one disassembly task on the first portion 106 and one disassembly task on the second portion 112 of the U-shaped conveyor belt 102. In a non-limiting example, the plurality of robots 122 may be robotic arms, also known as industrial robots or manipulators, which are capable to move and manipulate objects using a variety of joints and links and be equipped with the tools 124 to perform the disassembly tasks, and the central axis is a vertical axis passing through center of the base of the robotic arm and is the pivot point around which the robotic arm can rotate.

As used herein, in a non-limiting example, the disassembly task may involve using tools 124 such as a screwdriver or wrench to remove parts 128 like screws, bolts, or other fasteners that hold the component 126 in place. In another non-limiting example, the disassembly task may involve separating parts 128 in the component 126 that are attached to each other by tools 124, such as by using a pry bar or other tool to pry them apart. In yet another non-limiting example, the disassembly task may involve disconnecting parts 128 such as electrical wires or cables, or removing connectors or plugs, from the component 126. In still another non-limiting example, the disassembly task may involve using tools 124, such as a chemical washer or abrasive to remove paint, plating, or other coatings from the component 126. Such examples are non-limiting, and the disassembly task may also be a combination of multiple such tasks without departing from the spirit and the scope of the present disclosure.

As shown in FIG. 1, each workstation 120 has one side located on the first portion 106 of the U-shaped conveyor belt 102 and other side located on the second portion 112 of the U-shaped conveyor belt 102. In an aspect of the present disclosure, a length 'L' of each workstation 120 is configured to hold up to three robots 122. Herein, the robots 122 are positioned to be equally spaced within the length 'L' of the corresponding workstation 120. When there is only one robot 122 at the workstation 120, the robot 122 is positioned to face the middle of the length 'L' of the workstation 120. When there are two robots 122 at the workstation 120, as in case of the second workstation 120*b* in FIG. 1, a first robot (in this case, the fourth robot 122*d*) is positioned to face a center of a first half length (i.e., the first half of the length 'L') of the workstation 120*b*, and a second robot (in this case, the fifth robot 122*e*) is positioned adjacent to the first robot (the fourth robot 122*d*) to face a center of a second half length (i.e., the second half of the length 'L') of the workstation 120*b*. When there are three robots at the workstation, as in case of the first workstation 120*a* in FIG. 1, the first robot (in this case, the first robot 122*a*) is positioned to face a center of a first one third length (i.e., the first one third of the length 'L') of the workstation 120*a*, the second robot (in this case, the second robot 122*b*) is positioned adjacent to the first robot (the first robot 122*a*) to face a center of a second one third length (i.e., the second one third of the length 'L') of the workstation 120*a*, and a third robot (in this case, the third robot 122*c*) is positioned adjacent to the second robot (the second robot 122*b*) to face a center of a third one third length (i.e., the third one third of the length 'L') of the workstation 120*a*. Also, each robot 122 is further positioned so as to face one side of the workstation 120 located on the first portion 106 and to face other side of the workstation 120 located on the second portion 112 after rotation about its central axis. For instance, in case of the first robot 122*a* of the first workstation 120*a*, the first robot 122*a* may face one side of the workstation 120 located on the first portion 106 and may rotate about its central axis to face other side of the workstation 120 located on the second portion 112, as required.

In general, the multi-robotic U-shaped disassembly line 100 includes a series of workstations 120. Multiple robots 122 may be used on each workstation 120. In the multi-robotic U-shaped disassembly line 100, considering that the tasks are assigned on both the first portion 106 and the second portion 112, all of the robots 122 are designed to rotate about their corresponding central axis. For purposes of present disclosure, the time and cost of rotation of the robots 122 are ignored in the formulation of the model for the multi-robotic U-shaped disassembly line 100 (as discussed later). It may be understood that the robots 122 assigned to the same workstation 120 are located in the same designated area and share limited resources, such as the tools 124. Therefore, the number of robots 122 allocated to each workstation 120 is limited, and it may be required to determine a maximum number of robots 122 to be installed in each workstation 120 in the physical design of the multi-robotic U-shaped disassembly line 100.

In the multi-robotic U-shaped disassembly line 100, the robots 122 perform different tasks belonging to the same component or different components 126 at the same time. Further multiple components 126 may be disassembled simultaneously in the multi-robotic U-shaped disassembly line 100 to meet the demands of high efficiency and the task precedence and conflict relations of each component 126. For proper accounting/tracking, each component 126 may be assigned a corresponding component number and the disassembled parts 128 may be assigned a corresponding part number, which may be unique thereto. In the present context, the component number refers to the identification or labeling of individual components 126 being disassembled, and the part number refers to the identification or labeling of individual disassembled parts 128 after being disassembled. As illustrated in FIG. 1, the multi-robotic U-shaped disassembly line 100 may include an internal database 130 configured with records comprising a plurality of component numbers and constituent part numbers for each component number. The multi-robotic U-shaped disassembly line 100 further includes a user interface 132 configured to receive an input (as represented by 'I') of a component number; specifically, the component number of the component 126 as being received at the entrance end 108. In a non-limiting example, the component number may be in the form of a barcode or an RFID tag, and the entrance may be provided with a scanner to read the barcode/RFID tag to provide the input 'I' of the component number to the user interface 132. In another non-limiting example, the component being received at the entrance end 108 is tracked by using machine vision techniques, assigned a unique component number, with the assigned unique component number being provided as the input 'I' to the user interface 132. As may be contemplated, the constituent part numbers for each component number may be accounted/tracked in a similar manner.

During operation, the multi-robotic U-shaped disassembly line 100 requires a control mechanism for the U-shaped conveyor belt 102 and each robot 122 to execute disassembly of the components 126. The multi-robotic U-shaped disassembly line 100 includes a computing device 134 for such execution. As shown in FIG. 1, the computing device 134 is operatively connected to the U-shaped conveyor belt 102, to each robot 122, to the user interface 132 and to the internal database 130. The computing device 134 includes circuitry, at least one processor, and a memory including disassembly instructions for each component number. Details of the said various elements of the computing device 134 are discussed later in the description. In a non-limiting example, the disassembly instructions for each component number may be transmitted to the memory from the internal database 130 which, along with storing records related to the plurality of component numbers and the constituent part numbers for each component number, may also store the disassembly instructions for each component number. As used herein, the "disassembly instructions" for a component 126 are a set of detailed, step-by-step instructions that outline the process for disassembling the component 126 into its corresponding parts 128.

The processor is configured to execute the disassembly instructions to execute the disassembly operation in the multi-robotic U-shaped disassembly line 100. For this purpose, the processor is first configured to receive, from the user interface 132, the input 'I' of the component number for each component 126 located at the entrance 104 to the U-shaped conveyor belt 102. As discussed, the user interface 132 may receive the input 'I' by scanning a corresponding code or tracking by a machine vision technique, or the like. The processor is then configured to retrieve, from the memory, at least one disassembly task for each component number. The information about the disassembly task may be first fetched from the internal database 130 to be stored temporarily in the memory for easy retrieval by the processor. The processor is further configured to actuate the U-shaped conveyor belt 102 to move the components 126 past the workstations 120. That is, the processor may activate the U-shaped conveyor belt 102, and with each workstation 120 being located along at least one of the first portion 106 and the second portion 112 of the U-shaped conveyor belt 102, the component 126 placed at the entrance portion 104 of the U-shaped conveyor belt 102 is moved through all the workstations 120. The movement of the component 126 from one workstation 120 to another via the U-shaped conveyor belt 102 is an efficient and effective way for the disassembly process, and can help to streamline and improve efficiency of the multi-robotic U-shaped disassembly line 100.

The processor is further configured to command each of the plurality of robots 122 to use the at least one tool 124 to perform at least one disassembly task upon at least one workstation 120 as the components 126 move to the workstation 120. Herein, the robots 122 of a particular workstation 120 may work on disassembly of the component 126 into the corresponding disassembled parts 128 received thereat as per the corresponding disassembly instructions. In an aspect of the present disclosure, the computing device 134 is configured to generate a set of drive signals which cause the U-shaped conveyor belt 102 to move the component 126 to a designated workstation 120 for a cycle time and past each workstation 120 from the entrance 104 to the exit 116 at a speed determined by the processor based on the disassembly instructions. Herein, the cycle time may depend on the time required for the robots 122 to handle the component 126 at the designated workstation 120, which, in turn, may depend on the complexity of the disassembly operation and the capabilities of the robots 122 at the designated workstation 120.

The processor may be connected to a drive motor arrangement of the U-shaped conveyor belt 102 and may transmit the necessary drive signals to the drive motor arrangement in order to move the U-shaped conveyor belt 102 and transport the component 126 past each workstation 120 as per the defined cycle time in the disassembly instructions. The processor may move the U-shaped conveyor belt 102 in a start and stop pattern which places the component before a workstation 120 for a defined period of time. The defined period of time is related to the amount of time needed for a disassembly task. For example, for a disassembly task needing 5 minutes, the processor may stop the U-shaped conveyor belt 102 for 5 minutes before a workstation 120 which is designated to perform the task. Alternatively, the processor may control the speed of the U-shaped conveyor belt 102 and alternate the speed depending on the amount of time needed for the longest task. Once a long task has been completed, the processor may then increase the speed of the U-shaped conveyor belt 102 or modify the stopping time.

At the exit end 114 of the U-shaped conveyor belt 102, the sorter 118 is used to sort the disassembled parts 128 into different categories or groups by placing the disassembled parts 128 in different bins or the like. In a non-limiting example, the sorter 118 may be an extension of the U-shaped conveyor belt 102 itself with channels (not shown) formed therein, and the robot 122 nearest (or near) to the exit portion 116 may be configured (programmed) to place different type of the disassembled parts 128 in different channels of the sorter 118, such that each type of the disassembled parts 128 may be sorted in a different bin therefrom. Herein, the different types of the disassembled parts 128 may be identified using information about their part number, or by machine vision technique, or the like. In another non-limiting example, the disassembled parts 128 may be segregated by the sorter 118 using their physical or material properties, such as size, weight, shape, magnetic characteristics and the like. For instance, in the case of segregation by weight, the sorter 118 may have the form of a vibrating platform which can cause heavier parts to move less than lighter parts. Alternatively, in case of segregation by size, the sorter 118 may be designed as a ramp with a series of openings arranged in a gradient, with the openings becoming progressively larger from one end of the ramp to the other; and as the parts 128 are received at the sorter 118, those parts 128 may roll down the ramp and fall into the opening that is the closest match to their size. In yet another non-limiting example, the sorter 118 may be equipped with a multiple doors, each of which is designated for a specific type of the disassembled part 128, and as the disassembled parts 128 are received at the sorter 118, sensors or other identifying systems may be used to determine the type of each part 128, and accordingly the appropriate door may be opened, and thus corresponding type of the part 128 would be sorted. In still another non-limiting example, the sorter may be as simple as a ramp with openings graduated from smaller to larger, where the part falls into the opening for its size.

For efficient operation of the multi-robotic U-shaped disassembly line 100, it may be required to define the delivery instructions in advance which may be determined with aim to optimize robot assignment (i.e., assignment of number and type of robots 122 in each workstation 120) and task allocation (i.e., allocation of disassembly tasks to the robots 122 in each workstation 120). In particular, the robot assignment determines how to assign different types of robots 122 to each workstation 120, and the task allocation concerns how to allocate all the disassembly tasks performed for the different components 126 to suitable robots 122. These two problems interact with each other and need to be optimized at the same time.

According to aspects of the present disclosure, the disassembly instructions further include calculations for performing a multi-objective discrete brainstorming optimization. Multi-objective discrete brainstorming optimization (MODB) is an optimization method that is used to find solutions to problems with multiple objectives or conflicting criteria. MODB is a type of multi-objective optimization algorithm that is designed to search for solutions that are optimal in multiple dimensions simultaneously. MODB is a discrete optimization method, which means that it is used to find solutions to problems where the variables are discrete, rather than continuous. MODB is also a brainstorming method, which means that it involves generating and evaluating a large number of potential solutions in order to find the best one. In MODB, the optimization process begins by generating a large number of potential solutions, or candidates, using a variety of different methods, such as random sampling, heuristics, or evolutionary algorithms. These candidates are then evaluated based on their performance in terms of the multiple objectives or conflicting criteria. The candidates that perform the best in terms of the multiple objectives are then selected for further analysis, and the optimization process continues until an acceptable solution is found.

In the present disclosure, the following assumptions are made for performing the MODB. (i) for large-scale disassembly of multi-products, the multi-robotic U-shaped disassembly line 100 is established, and AND/OR graphs (as discussed in the following paragraphs) of all components 126 to be disassembled are given; (ii) each disassembly task is to split the components 126 into two new parts 128, and each component 126 should be selectively disassembled; (iii) the reuse value of each part 128 obtained in the disassembly process of each component 126 is given and it is constant; (iv) the time and cost required to perform a disassembly task depends on the type of robot 122 assigned, which is given and constant; (v) the workstations 120 are arranged linearly, and U-shaped conveyor belt 102 is arranged in a 'U'-shape and goes around both sides of the entrances and exits of all workstations 120, and the cycle time of the workstations 120 is given as constant; (vi) each workstation 120 can be assigned multiple robots 122, and the maximum number of robots 122 in each workstation 120 is given; (vii) each robot 122 can only execute one task at a time, and each task can only be performed by one robot 122; (viii) no task can be subdivided, and precedence and conflict relations (as discussed in the proceeding paragraphs) in AND/OR graph need to be satisfied when assigning tasks; (ix) the processing time of a workstation 120 needs to be less than the cycle time; and (x) the setup time and setup cost between tasks are ignored.

Based on the above, the processor is configured to execute calculations to construct an AND/OR graph of the disassembly tasks for each component 126. As used herein, the AND/OR graph is used to describe task precedence and conflict relationships (as discussed later in more detail). The AND/OR graph may describe all possible disassembly tasks, subassemblies, and their relations. Only a few possible disassembly tasks are selected to disassemble the product. The AND/OR graph is an effective method to model the precedence and conflict relationships among tasks of disassembling the components 126 (such as EOL products). In aspects of the present disclosure, the AND/OR graph is composed of rectangles and directed angles. A rectangle represents a subassembly or part, where a number in an angle bracket indicates the subassembly or part number, and the numbers outside the angle bracket indicate the part information contained in the subassembly or part. A directed angle represents a task, where a number in the directed angle represents the task number, and a directional arrow indicates the relationship between subassemblies or parts and subassemblies or parts. There can be one or more directed angles in front or behind the rectangle, and only one of them can be executed when there are multiple directed angles.

The processor is then configured to execute the calculations to construct a precedence and conflict matrix, P, of the disassembly tasks based on the AND/OR graph. The processor is also configured to execute the calculations to construct a succession matrix, S, of the disassembly tasks. Herein, the succession matrix, S, is configured to define a succession relationship of the disassembly tasks. The processor is further configured to execute the calculations to construct an incidence matrix, D, which is configured to model a relationship between each component part and each disassembly task and facilitate calculation of a profit of the disassembly. Specifically, according to the characteristics of the AND/OR graph, it may be possible to derive the three matrices P, S, and D as follows.

(1) To describe these precedence and conflict relationships of tasks required in an AND/OR graph, a precedence and conflict matrix P=[$p_{jk}$] is constructed, where $$p_{jk} = \begin{cases} 1, & \text{if task } j \text{ can be performed before task } k; \\ -1, & \text{if tasks } j \text{ and } k \text{ conflict with each other}; \\ 0, & \text{otherwise}. \end{cases}$$

(2) A disassembly process needs to satisfy the precedence relationship between two adjacent tasks. For example, in FIG. 2A, the task 1 needs to be completed before starting task 3. This work adopts a succession matrix S=[$s_{jk}$] to represent the succession relationship of tasks, where $$s_{jk} = \begin{cases} 1, & \text{if task } j \text{ must be performed immediately before task } k; \\ 0, & \text{otherwise}. \end{cases}$$

(3) To facilitate profit calculation, an incidence matrix D=[$d_{ij}$] is constructed to model the relationships between subassemblies and tasks, where $$d_{ij} = \begin{cases} 1, & \text{if subassembly } i \text{ is obtained by task } j; \\ -1, & \text{if subassembly } i \text{ is disassembled by task } j; \\ 0, & \text{otherwise}. \end{cases}$$

Figure 2A:
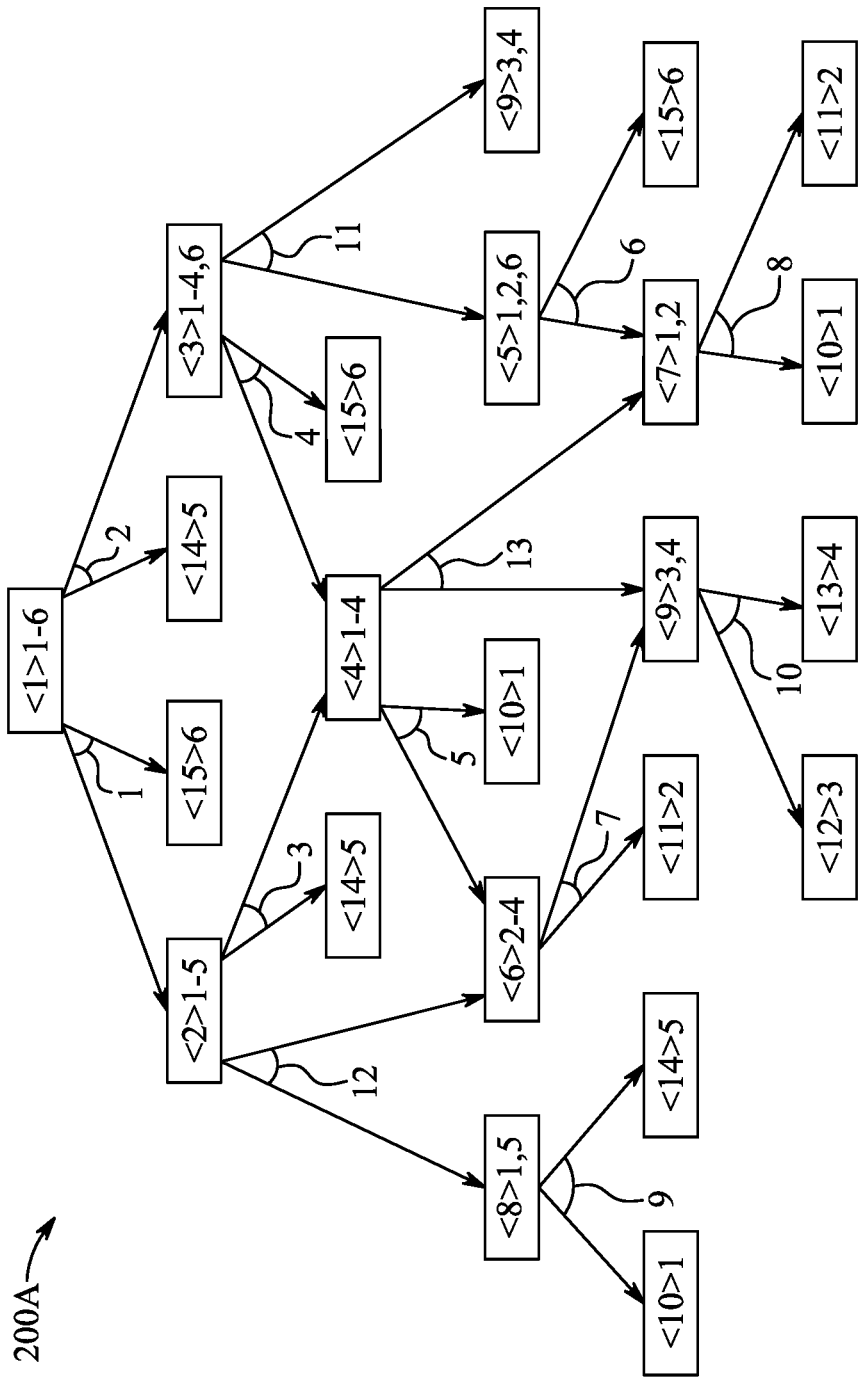
FIG. 2A is an exemplary AND/OR graph of disassembly tasks for a first multi-product instance, according to certain embodiments.
Figure 2B:
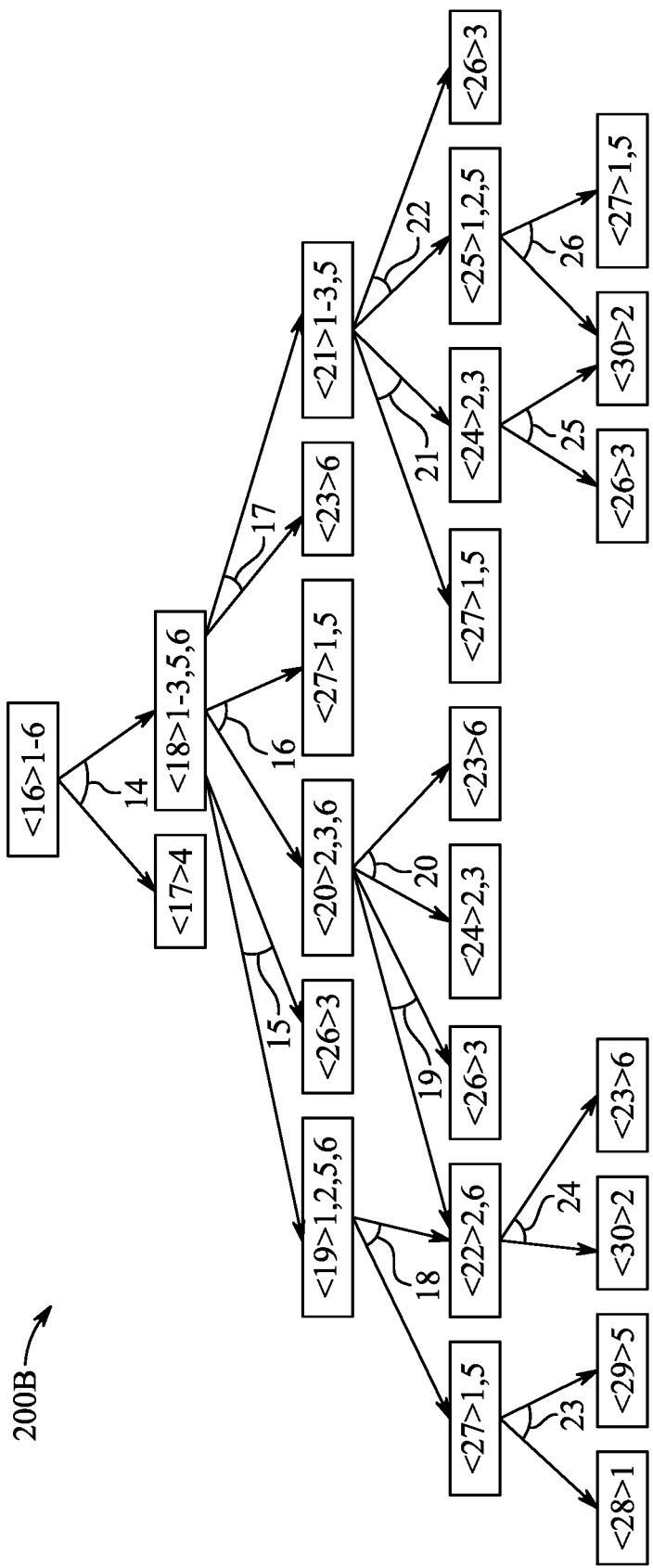
FIG. 2B is an exemplary AND/OR graph of disassembly tasks for a second multi-product instance, according to certain embodiments.

Consider a small-scale example, in which there are two products, a first multi-product instance which is a ballpoint pen 1 and a second multi-product instance which is a ballpoint pen 2, to be simultaneously disassembled. In the present example, the ballpoint pen 1 and the ballpoint pen 2 are composed of 6 and 10 parts, respectively. FIG. 2A is an exemplary AND/OR graph 200A of disassembly tasks for the first multi-product instance which is a ballpoint pen 1, and FIG. 2B is an exemplary AND/OR graph 200B of disassembly tasks for a second multi-product instance which is a ballpoint pen 2. Herein, the tasks are numbered in an increasing order across the two multi-product instances. Referring to FIG. 2A in detail, the notation <1> represents the ballpoint pen 1 which may be noted as '1-6', <3> represents the subassembly '1-4, 6' which consists of part 1 through 4 and part 6. The AND/OR graph 200A of such multi-product instance includes thirty-nine rectangles and thirty-three directed angles. As shown in FIGS. 2A and 2B, some rectangles have more than one directed angle, but only one directed angle can be selected to perform. These directed angles conflict with each other, that is, OR relationship. Different directed angles from the same rectangle are mutually exclusive. For example, subassembly 1 can only be performed by task 1 or task 2, then tasks 1 and 2 conflict with each other. Each directed angle connects two-child rectangles with a parent rectangle. The AND relation guarantees that child rectangles can be obtained only after completing the directed angle of their parent rectangle. For example, <3> is disassembled into <5> and <9> by task 11. From FIG. 2A, it can be observed that there are multiple disassembly alternatives, although the ballpoint pen 1 has only six parts. As such, the AND OR relationships could be complex even for a simple product. It may be understood that the AND/OR graph 200B of disassembly tasks for the second multi-product instance, i.e., the ballpoint pen 2, may be generated in similar manner and thus the process is not described herein for brevity of the present disclosure.

Figure 3A:
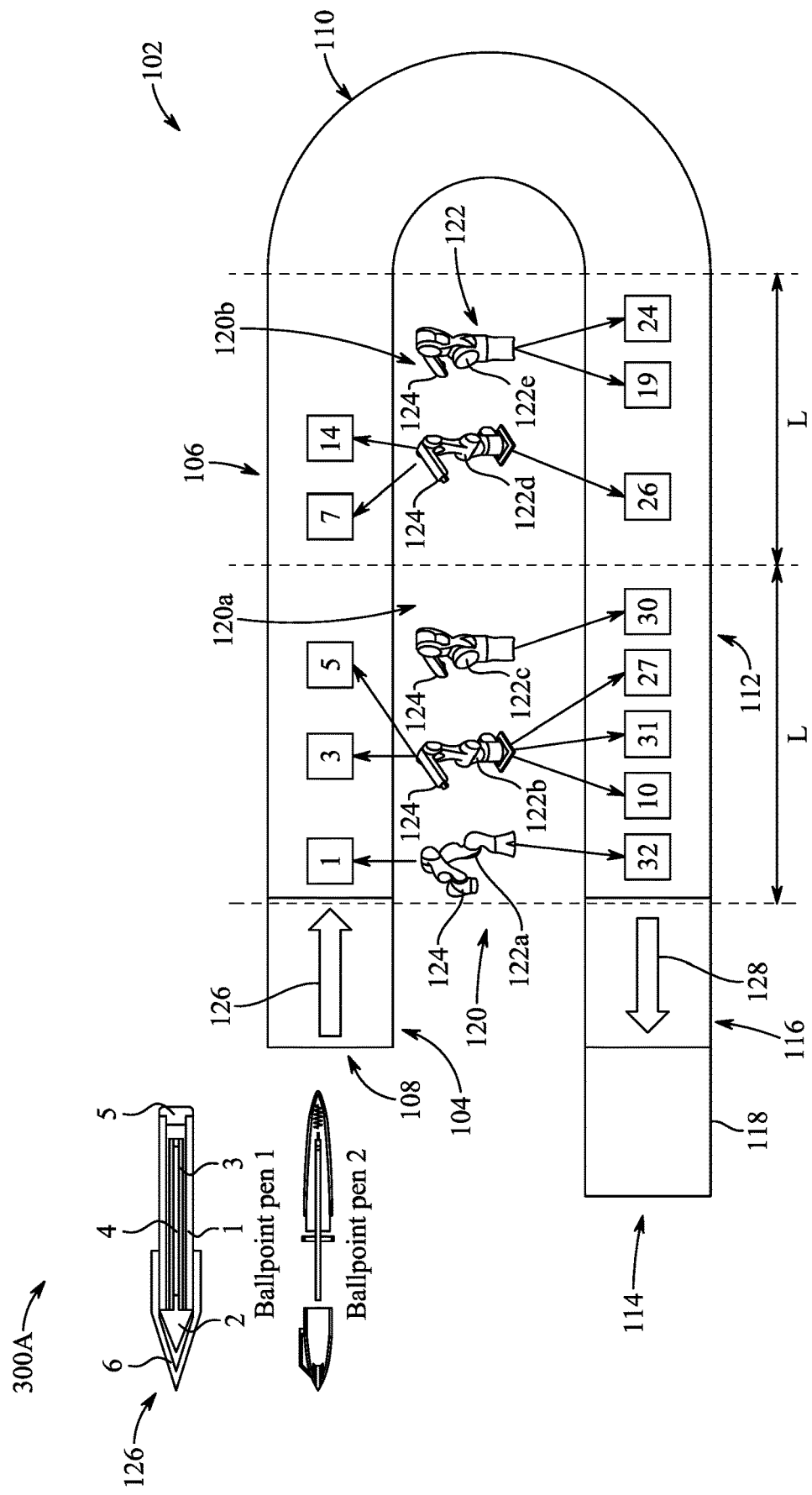
FIG. 3A is an exemplary schematic of a disassembly operation by the multi-robotic U-shaped disassembly line, according to certain embodiments.
Figure 3B:
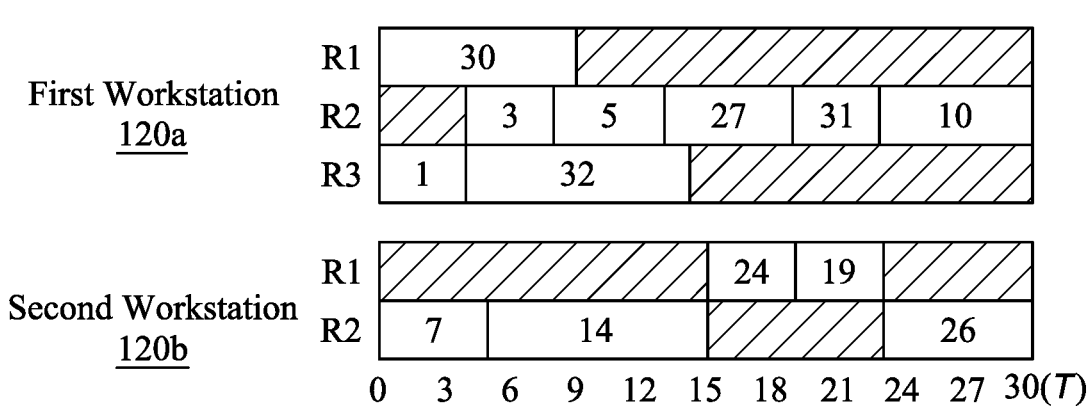
FIG. 3B is an exemplary disassembly sequence for the disassembly operation by the multi-robotic U-shaped disassembly line, according to certain embodiments.

Referring to FIG. 3A, illustrated is a schematic of a disassembly operation (as represented by reference numeral 300A) by the multi-robotic U-shaped disassembly line 100 for simultaneous disassembly of the first multi-product instance, i.e., the ballpoint pen 1 and the second multi-product instance, i.e., the ballpoint pen 2 as the components 126. Herein, the ballpoint pen 1 is shown with its six parts 128 labelled as 1-6. Further, FIG. 3B provides a disassembly sequence (as represented by reference numeral 300B) for the disassembly operation 300A of FIG. 3A. Based on the AND/OR graph 200A of FIG. 2A, the multi-robotic U-shaped disassembly line 100 may perform, in a non-limiting example of illustrating the sequence of disassembly tasks, the disassembly sequence '1, 3, −32, −10, 5, −31, −27, −30, 7, −26, −19, 14, −24', where the negative sign indicates that the disassembly task is being performed on the second portion 112 of the U-shaped conveyor belt 102. Considering the task precedence constraint, some tasks must be executed after their predecessors are completed. For example, task 3 starts after task 1. It is noted that task −32 and the executed task 1 and task 3 have no precedence constraints, so they can be executed at the same time. However, since task 1 and task −32 are performed by the first robot 122a, and task 1 is before task −32 in the disassembly sequence, task −32 can only be executed after task 1.

Also, Table I below provides the disassembly time of all selected disassembly tasks performed by the three types of robots 122 in the multi-robotic U-shaped disassembly line 100. It may be understood that the schedules shown in FIG. 2B are based on the task execution times listed in Table I, in which $t_i$ is the time span when a task is executed in a robot of type i, i=1, 2, 3.

TABLE I

Disassembly time example of using three robots for selected disassembly tasks.

| Task id | $t_1$ | $t_2$ | $t_3$ | Task id | $t_1$ | $t_2$ | $t_3$ |
|---|---|---|---|---|---|---|---|
| 1  | 6  | 10 | 4  | 26 | 5 | 7  | 7  |
| 3  | 8  | 4  | 7  | 30 | 9 | 5  | 10 |
| 5  | 10 | 5  | 4  | 27 | 9 | 6  | 8  |
| 7  | 9  | 5  | 10 | 31 | 8 | 4  | 5  |
| 14 | 7  | 10 | 9  | 32 | 9 | 10 | 10 |
| 24 | 4  | 6  | 7  | 10 | 5 | 7  | 7  |
| 19 | 4  | 7  | 6  |    |   |    |    |

Figure 4A:
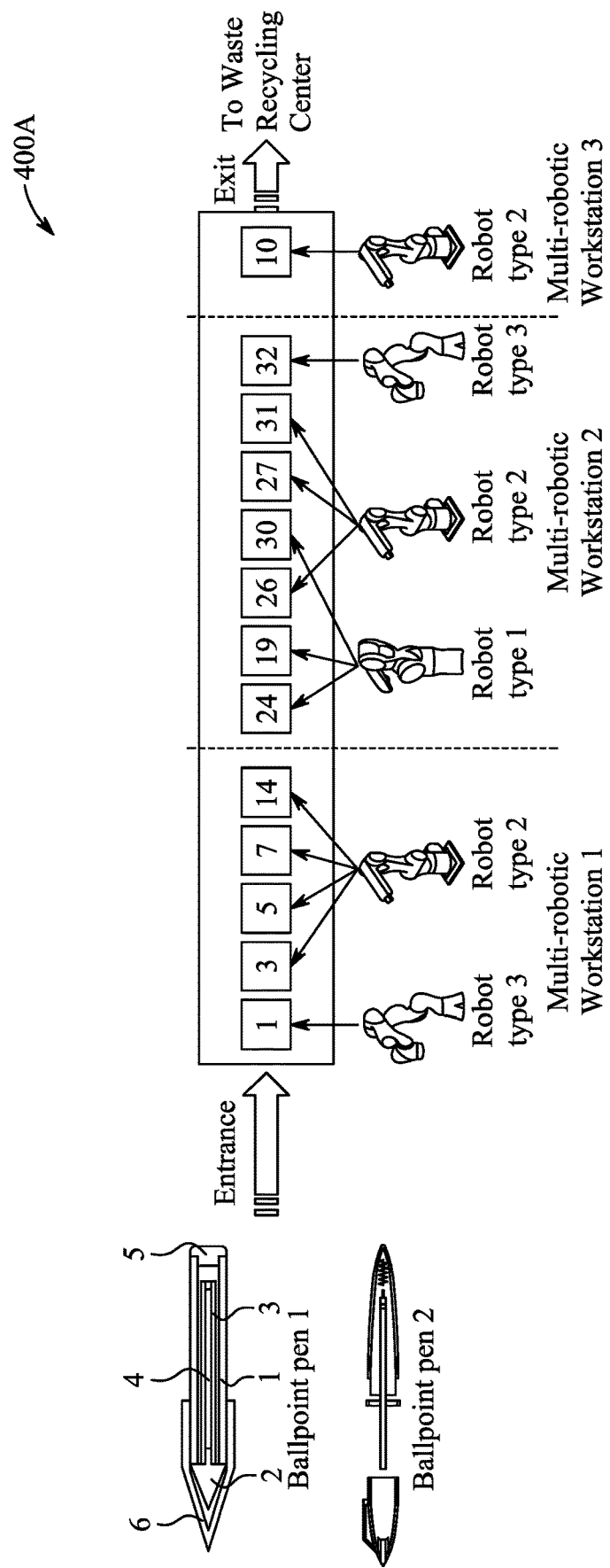
FIG. 4A is an exemplary schematic of a disassembly operation by a conventional linear conveyor belt, according to certain embodiments.
Figure 4B:
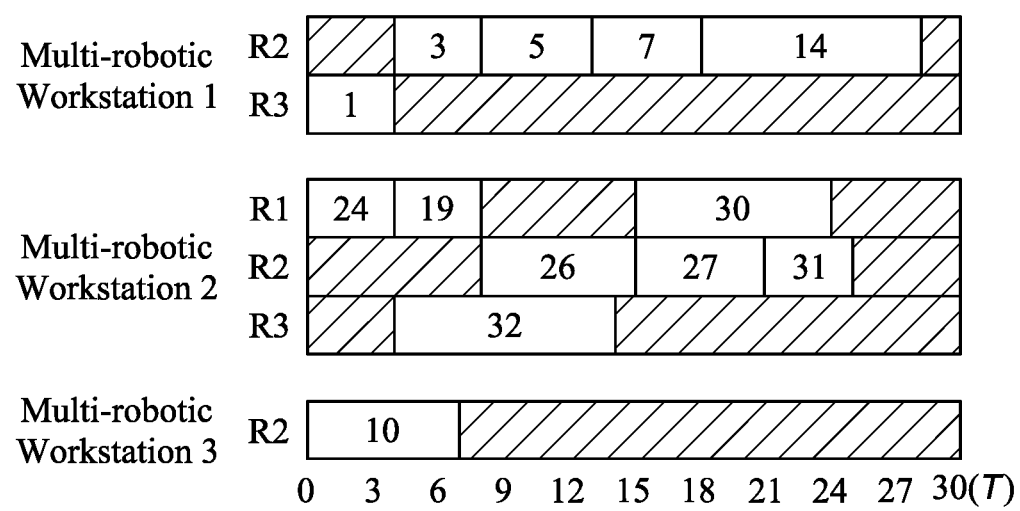
FIG. 4B is an exemplary disassembly sequence for the disassembly operation by the conventional linear conveyor belt, according to certain embodiments.

Further, to illustrate the advantage of the U-shaped conveyor belt 102 as used in the multi-robotic U-shaped disassembly line 100 of the present disclosure, a conventional linear conveyor belt is used for comparison. FIG. 4A illustrates a schematic of a disassembly operation (as represented by reference numeral 400A) by a conventional linear conveyor belt for the same first multi-product instance, i.e., the ballpoint pen 1. Also, FIG. 4B provides a disassembly sequence (as represented by reference numeral 400B) for the different workstations in the conventional linear conveyor belt. Herein, the cycle time of each workstation is set to 30 time units. As may be seen, the conventional linear conveyor belt needs 3 workstations and 6 robots for completing the disassembly operation. However, the U-shaped conveyor belt 102 as used in the multi-robotic U-shaped disassembly line 100 of the present disclosure only needs 2 workstations 120 and 5 robots 122. Also in comparison to the conventional linear conveyor belt, the entrance 104 of the component 126 to be disassembled and the exit 116 of the disassembled parts 128 are on the same side in the U-shaped conveyor belt 102, which may help to simplify the disassembly operation and reduce the logistics cost.

In some aspects of the present disclosure, as shown in FIG. 1, the computing device 134 is configured to wirelessly transmit (as represented by dashed connection) the AND/OR graph, the precedence and conflict matrix P, the succession matrix S, and the incidence matrix D to a server 136. Herein, the server 136 is configured with an external database 138. Again, details of the hardware for the server 136 and the external database 138 have been described later in the description.

The present disclosure further provides an Improved Multi-objective Discrete Brainstorming Optimization (IM-DBO) algorithm, which is developed based on a disassembly model, as discussed later in detail. As the disassembly line balancing problem (DLBP) is an NP-hard problem, metaheuristic methods are suitable for solving such complex problems. Compared to other metaheuristics, the IMDBO algorithm is superior in efficiently producing a variety of feasible disassembly sequences and creating a high-quality Pareto front for designing of the multi-robotic U-shaped disassembly line 100 (also referred to as "Multi-robotic Multi-product U-shaped Disassembly-line-balancing (MVUD) system" hereinafter, without any limitations). The solution is based on the Brainstorming Optimization Algorithm (BOA) algorithm that simulates a process of human brainstorming conference and proceeds with the clustering phase, new individual generation phase, and selection phase. In the BOA, an idea refers to a solution or individual. Due to its simplicity and ease of implementation, the BOA has been used to solve many practical and complex industrial optimization problems. However, the basic BOA is originally designed for continuous function optimization rather than the mathematical model as described in the preceding paragraphs.

Figure 5:
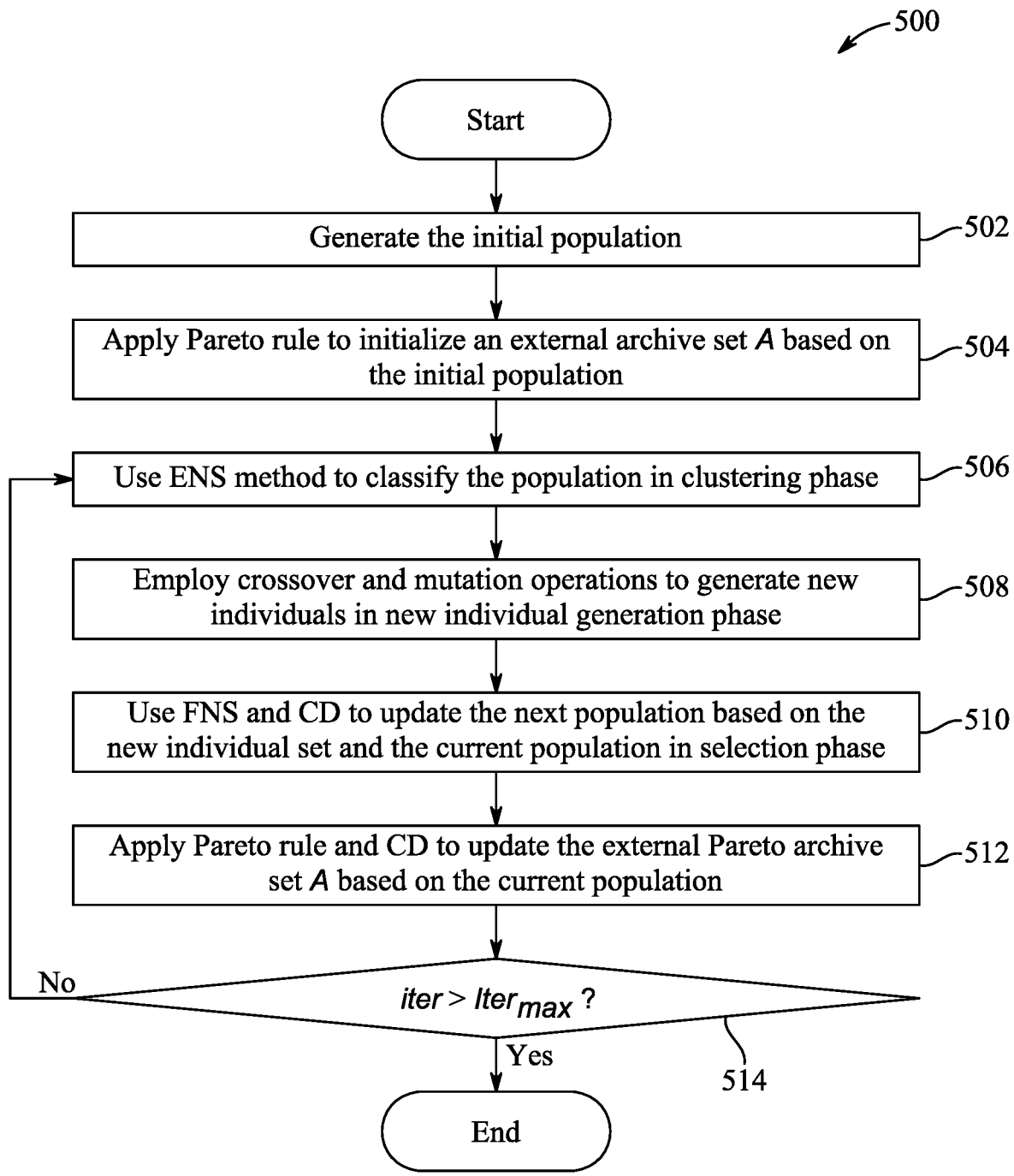
FIG. 5 is an exemplary flowchart for implementation of an Improved Multi-objective Discrete Brainstorming Optimization (IMDBO) algorithm, according to certain embodiments.

Referring to FIG. 5, illustrated is a flowchart 500 for implementation of the IMDBO algorithm. For such implementation, the processor, as part of the computing device 134, is configured to execute the calculations for performing the multi-objective discrete brainstorming optimization. Herein, first, the basic BOA is adjusted to a discrete version for designing the MMUD system 100. Secondly, the efficient non-dominated sorting (ENS) method is employed for clustering. Then, the crossover and mutation operators are designed to further improve the exploitation ability of the IMDBO algorithm. In addition, Pareto solutions are found via a fast nondominated sorting (FNS) method and a crowding distance (CD) method, where FNS includes the Pareto rule. In particular, the implementation of the IMDBO algorithm is divided into six stages, including (1) population initialization, (2) initialization of external archive set A, (3) clustering phase, (4) new individual generation phase, (5) selection phase, and (6) update of external Pareto archive set A.

Specifically, as shown in the flowchart 500 of FIG. 5, at step 502, the processor is configured to execute the calculations to generate an initial population of the disassembly tasks based on the precedence and conflict matrix, P, the succession matrix, S, and the incidence matrix, D. Then, at step 504, the processor is configured to execute the calculations to apply a Pareto rule to the initial population and initialize an external archive set A (also interchangeably referred to as "external Pareto archive set A") stored in the external database 138. Further, at step 506, the processor is configured to execute the calculations to cluster the initial population by a non-dominated sorting calculation. Further, at step 508, the processor is configured to execute the calculations to generate a next population by using crossover and mutation operations. Further, at step 510, the processor is configured to execute the calculations to update the next population by using a fast nondominated sorting (FNS) calculation and a crowding distance (CD) calculation. Further, at step 512, the processor is configured to execute the calculations to apply the Pareto rule and the crowding distance (CD) calculations to update the external archive set A. The algorithm repeats the process at step 514 (except for the steps 502 and 504) until it reaches the maximum iteration $Iter_{max}$.

In aspects of the present disclosure, the processor is further configured to execute the calculations to maximize a disassembly profit and minimize a smoothness index for the multi-robotic U-shaped disassembly line 100. That is, the optimization objectives for the multi-robotic U-shaped disassembly line 100 in the present disclosure include maximizing the disassembly profit and minimizing the smoothness index. As used herein, the term "disassembly profit" may refer to profit (i.e., amount of money) that is made from the disassembly and recycling of the components 126, such as end-of-life (EOL) products, into the corresponding disassembled parts 128 in the multi-robotic U-shaped disassembly line 100. This profit may be calculated by subtracting the costs associated with the disassembly process from the revenue generated from the sale of the recovered parts 128. It may be noted that the costs associated with the disassembly process, includes the costs of equipment, energy, processing, and any other expenses. The higher the disassembly profit, the better; and thus the objective of the present disclosure is to maximize the disassembly profit for the multi-robotic U-shaped disassembly line 100. Further, the term "smoothness index" may refer to an index calculated by measuring the time it takes to disassemble a certain number of components 126 and comparing this time to the expected time it should take to disassemble those components 126 based on the disassembly instructions and the capabilities of the multi-robotic U-shaped disassembly line 100. A lower the smoothness index is desired; and thus the objective of the present disclosure is to minimize the smoothness index for the multi-robotic U-shaped disassembly line 100.

Aspects of the present disclosure also provide a mathematical model for disassembly (also referred to as "disassembly model") in the multi-robotic U-shaped disassembly line 100.

The mathematical model is developed to meet the objectives of maximizing the disassembly profit and minimizing the smoothness index for the multi-robotic U-shaped disassembly line 100. The notations and decision variables for modeling the multi-robotic U-shaped disassembly line 100 are defined as follows.

Notations:

$g$, $\varphi$ EOL product indices, $g$, $\varphi \in \{1, 2, \ldots, G\}$, where G represents the number of disassembled products.

$i$ subassembly index, $i \in \{1, 2, \ldots, N^g\}$, where $N^g$ denotes the number of subassemblies in product g.

$j$, $k$ task indices, $j$, $k \in \{1, \ldots, J^g\}$, where $J^g$ means the number of tasks in product g.

$l$, $m$ workstation indices, $l$, $m \in \{1, 2, \ldots, M\}$, where M is the number of workstations.

$r$ robot type index, $r \in \{1, 2, \ldots, R\}$, where R denotes the number of robot types.

w, ŵ location-allocation indices, w, ŵ ∈ {0, 1}, if w, ŵ=0, tasks are allocated to the entrance side of the workstation; otherwise, they are allocated to the exit side of the workstation.

$t_{jr}^g$ disassembly time for task j in product g performed by robot r.

$c_{jr}^g$ cost per unit of time of performing task j in product g performed by robot r.

$c_l$ cost per unit of time during the l-th workstation operation.

$v_i^g$ reuse value of subassembly/part i in product g.

T cycle time of the workstation.

L large number.

$P^g$ precedence and conflict matrix of a given product g.

$S^g$ succession relationship matrix of a given product g.

$D^g$ disassembly-incidence matrix of a given product g.

$p_{jk}$ an element in the j-th row and k-th column of $P^g$.

$s_{jk}$ an element in the j-th row and k-th column of $S^g$.

$d_{ij}$ an element in the i-th row and j-th column of $D^g$.

Decision Variables:

$$x_{jr}^g = \begin{cases} 1, & \text{if disassembly task } j \text{ in product } g \text{ is performed by robot } r; \\ 0, & \text{otherwise.} \end{cases}$$

$$y_{jwl}^g = \begin{cases} 1, & \text{if disassembly task } j \text{ in product } g \text{ is assigned to the } w \text{ side of the } l\text{-th workstation;} \\ 0, & \text{otherwise.} \end{cases}$$

$$z_{rl} = \begin{cases} 1, & \text{if robot } r \text{ is allocated to the } l\text{-th workstation;} \\ 0, & \text{otherwise.} \end{cases}$$

$$u_l = \begin{cases} 1, & \text{if the } l\text{-th workstation is used} \\ 0, & \text{otherwise.} \end{cases}$$

Based on these notations and decision variables, the mathematical formulae for the two objectives and constraints of the mathematical model are as follows.

The objective function (1) below aims to maximize a disassembly profit, in which the first term in the right-hand side is the total profit, the second term the total disassembly cost, and the third term the workstation cost.

$$\max f_1 = \sum_{g=1}^{G}\sum_{j=1}^{J^g}\sum_{w=0}^{1}\sum_{l=1}^{M}\sum_{r=1}^{R} d_{ij}v_i^g x_{jr}^g y_{jwl}^g - \sum_{g=1}^{G}\sum_{j=1}^{J^g}\sum_{w=0}^{1}\sum_{l=1}^{M}\sum_{r=1}^{R} t_{jr}^g c_{jr}^g x_{jr}^g y_{jwl}^g - \sum_{l=1}^{M} T c_l u_l \quad (1)$$

The objective function (2) below aims to minimize a smoothness index.

$$\min f_2 = \sum_{l=1}^{M}(T_l u_l - \sum_{g=1}^{G}\sum_{j=1}^{J^g}\sum_{w=0}^{1}\sum_{r=1}^{R} t_{jr}^g x_{jr}^g y_{jwl}^g)^2 \quad (2)$$

The objective functions (1) and (2), as provided above, are subjected to constrains in which:

Constraint (3) below guarantees that each product is disassembled by at least one task, and constraint (4) below represents each task of multiple components 126 may only be assigned to one side of the workstation 120, and the robot 122 performs it.

$$\sum_{j=1}^{J^g}\sum_{l=1}^{M}\sum_{w=1}^{1}\sum_{r=1}^{R} x_{ij}^g y_{jwl}^g \geq 1, g=1, 2, \ldots, G \quad (3)$$

$$\sum_{l=1}^{M}\sum_{w=0}^{1}\sum_{r=1}^{R} x_{jr}^g y_{jwl}^g \leq 1, g=1, 2, \ldots, G, j=1, 2, \ldots, J^g \quad (4)$$

Further, constraint (5) below means that each switched-on workstation must be assigned at least one task, and one robot performs it. Constraints (6) and (7) below ensure the disassembly tasks on the U-shaped disassembly line must satisfy the precedence relationship and conflict relation, respectively. Constraint (8) below provides that if disassembly task j is assigned to the l-th workstation and performed by robot r, then robot r is assigned to the l-th workstation.

$$\sum_{g=1}^{G}\sum_{j=1}^{J^g}\sum_{w=0}^{1}\sum_{r=1}^{R} x_{jr}^g y_{jwl}^g \geq u_l, l=1, 2, \ldots, M \quad (5)$$

$$\sum_{l=1}^{M}(l(y_{j0l}^g - y_{k0l}^g) + (2M-l)(y_{j1l}^g - y_{k1l}^g)) \leq 0, g=1, 2, \ldots, G, s_{jk}=1 \quad (6)$$

$$\sum_{l=1}^{M}\sum_{w=0}^{1}(y_{jwl}^g + y_{kwl}^g) \leq 1, g=1, 2, \ldots, G, \forall p_{jk} = -1 \quad (7)$$

$$\sum_{g=1}^{G}\sum_{j=1}^{J^g}\sum_{w=0}^{1} x_{jr}^g y_{jwl}^g \leq L \cdot z_{rl}, l=1, 2, \ldots, M, r=1, 2, \ldots, R \quad (8)$$

Furthermore, constraint (9) below denotes the processing time of each workstation used is no more than the cycle time, and constraint (10) below defines the value range of decision variables.

$$\sum_{g=1}^{G}\sum_{j=1}^{J^g}\sum_{w=0}^{1}\sum_{r=1}^{R} t_{jr}^g x_{jr}^g y_{jwl}^g \leq T \cdot u_l, l=1, 2, \ldots, M \quad (9)$$

$$x_{jr}^g, y_{jwl}^g, z_{rl}, u_l \in \{0,1\}, g=1, 2, \ldots, G, j=1, 2, \ldots, J^g, l=1, 2, \ldots, M, w=0,1, r=1, 2, \ldots, R \quad (10)$$

$$x_{jr}^g, y_{jwl}^g, z_{rl}, u_l \in \{0,1\}, g=1, 2, \ldots, G, j=1, 2, \ldots, J^g, l=1, 2, \ldots, M, w=0,1, r=1, 2, \ldots, R$$

It may be appreciated that a desirable solution representation may clearly illustrate a solution. To be consistent with the disassembly model (as described above), task indices and robot indices are used to denote disassembly solutions. For example, a disassembly sequence of FIG. 3B is (1, 3, 5, 7, 14, 24, 19, 26, 30, 27, 31, 32, 10) and a robot sequence is (3, 2, 2, 2, 2, 1, 1, 2, 1, 2, 2, 3, 2), where the tasks are sequentially performed by the corresponding type of robots. Given such a disassembly solution representation, the disassembly profit and the smoothness index may be calculated by Eqs. (1) and (2) as described above. Also, it may be appreciated that the challenge of generating initial population is in the feasibility of a solution. To tackle this challenge, a double-phase heuristic approach is adopted in the present disclosure to efficiently generate feasible disassembly sequences that satisfy the precedence relationship requirements and characteristics of a U-shaped layout. For the double-phase heuristic, a triple-vector list structure is defined as $b=(b^1, b^2, b^3)$, where $b^1=(s_1, \ldots, s_j, \ldots, s_J)$ which represents a sequence of disassembly tasks with each element corresponding to a task, $b^2=(d_1, \ldots, d_j, \ldots, d_J)$ is a binary vector such that $a_j$ is 1 if $s_j$ of $b^1$ is performed, otherwise 0, and $b^3=(e_1, \ldots, e_j, \ldots, e_J)$ indicates a robot sequence, each element corresponds to a robot type that performs the corresponding task. For instance, if $b^1=(1,3,4,2,8,6,7,5)$, $b^2=(1,0,0,1,0,1,1,0)$, and $b^3=(1,1,2,3,2,1,1,3)$ then it may be concluded tasks 1, 2, 6 and 7 are carried out by a robot of type 1 since $d_1$, $d_4$, $d_6$ and $d_7$ are equal to 1 in $b^2$ as well as $e_1$, $e_4$, $e_6$ and $e_7$ are equal to 1 in $b^3$. Based on this triple-vector list structure, the double-phase heuristic is presented as follows with two phases.

In Phase 1, b is adjusted to b' for satisfying the precedence constraints and eliminating the conflict tasks of b'. As aforementioned, a feasible disassembly sequence needs to meet precedence relation and eliminate conflict relation. To start, b, i.e., $b^1$, $b^2$, and $b^3$ is randomly generated. Then, the following three steps are followed, taking example of the ballpoint pen 1 (as described above), and a flow diagram 600 for which is also presented in FIG. 6.

Step 1: Adjust to satisfy the precedence relationship.
for j=1, 2, . . . J:
for k=j+1 . . . J:

if $p_{kj}=1$:

swap $s_j$ and $s_k$ as well as $e_j$ and $e_k$

Step 2: $b^2$ is adjusted to satisfy the precedence relationship and ensure at least one task is executed.

for g=1, 2, . . . G:
for j=1, 2, . . . J:
if $s_j IQ^g$, where $Q^g$ is the starting task set of product g
if $a_j=0$
select a task $s_k$ randomly in $Q^g$, and $a_k$ is reset to 1.
for k=1, 2, . . . J
for j=1, 2 . . . J.
if $d_k=1$ and $p_{jk}=1$
$a_j$ is reset as 1

Figure 6:
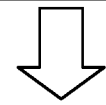
FIG. 6 is an exemplary flow diagram for adjusting b to b' for a component in Phase 1 of the implementation of the IMDBO algorithm, according to certain embodiments.
Figure 6:
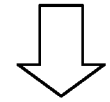
Figure 6:
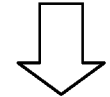

Step 3: Eliminate conflict tasks to obtain the final adjusted b'.

for j=1, 2, . . . J:

To have a more intuitive understanding of the adjustment in Phase 1, the example of ballpoint pen 1 in the flow diagram 600 as depicted in FIG. 6 is considered with R 3. As shown, a random solution b is first generated, then $b^1$ is adjusted following Step 1 to satisfy the precedence relationship, and $b^2$ is adjusted following Step 2 to satisfy the precedence relationship and ensure at least one task is executed. Finally, the conflict tasks are eliminated following Step 3 and the final adjusted b, i.e., b' is obtained.

Figure 7:
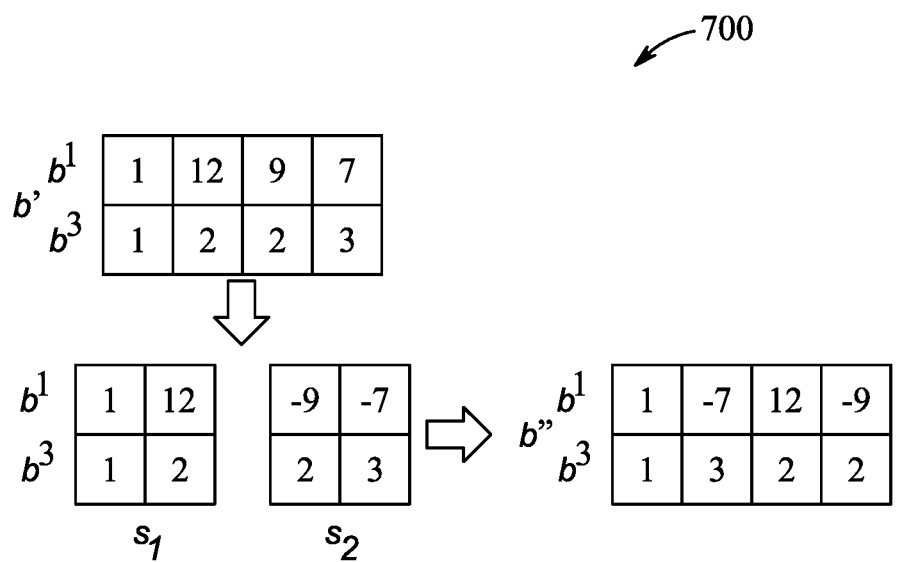
FIG. 7 is an exemplary flow diagram for adjusting b' to b" for the component in Phase 2 of the implementation of the IMDBO algorithm, according to certain embodiments.

Further, in Phase 2, b' is further adjusted to b" for satisfying characteristics of the multi-robotic U-shaped disassembly line 100. Considering that tasks in the U-shaped conveyor belt 102 are assigned to the entrance portion 104 and exit portion 116 of workstations 120, the disassembly sequence is divided into two subsequences of random size. The first subsequence remains unchanged. In the second subsequence, each task from back to front is multiplied by minus one, and then randomly inserted into the first subsequence. Referring to FIG. 7, a flow diagram 700 is provided which takes b' as a non-limiting example for implementation of the Phase 2. The detailed steps for the flow diagram 700 are as follows.

Step 1: Extract the tasks to be performed and the corresponding robot type from b', then aggregate them into an updated b' (e.g., b'={{1, 12, 9, 7}, {1, 2, 2, 3}}, as obtained in the flow diagram 700).

Step 2: Randomly generate an integer $м \in Î\{1, 2, 3, 1_{b'}\}$, where $1_{b'}$ is a length of $b^1$ in b' (e.g., $1_{b'}=4$, $м=2$, as shown in the flow diagram 700). The first subsequence $s_1$ remains unchanged, and each element of $b^1$ in the second subsequence $s_2$ is multiplied by minus one.

Step 3: Select the last element of $b^1$ and $b^3$ in $s_2$ and insert it into the random position in $s_1$. And then remove this element from $s_2$. Repeat this step until $s_2$ is empty.

After the three steps, a feasible solution b" is obtained, as shown in the flow diagram 700.

Figure 8:
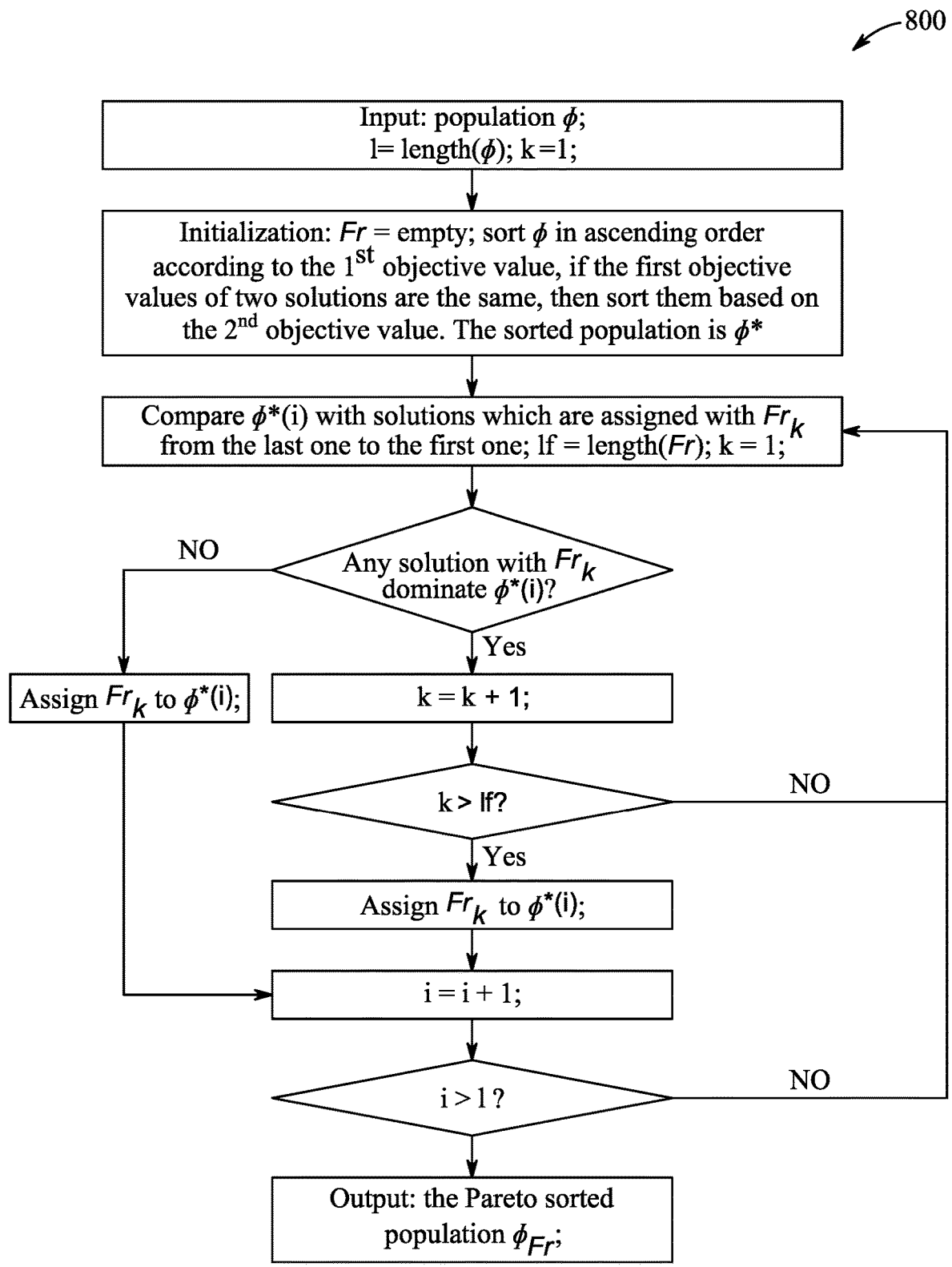
FIG. 8 is an exemplary flowchart for a clustering phase of the implementation of the IMDBO algorithm, according to certain embodiments.

Referring back to FIG. 5, the goal of clustering (as described in the step 506 of the flowchart 500) is to divide the population solutions into several clusters. Considering that designing the MMUD system 100 is a discrete multi-objective optimization problem, the original k-means clustering algorithm is not suitable for the present disclosure, so it is combined, in a non-limiting example, with an ENS method, which is a Pareto-based multi-objective optimization method. These methods are based on the principle of Pareto optimality, which states that a solution is optimal if there is no other solution that is better in all objectives. In a non-limiting example, ENS is used to improve the efficiency of the Pareto sorting method without changing the sorting results. As shown in a flowchart 800 of FIG. 8, population F is sorted in ascending order according to the first objective value. If the first objective values of two solutions are the same, then the solutions are sorted in ascending order according to the second objective value. After that, the sorted population F* is obtained. Herein, the solution F*(1) may be assigned front-ranking Fri because no solution in the population F* dominates it. For solution F*(i) (i=2, 3 . . . ), it may be compared with the solutions which have been assigned $Fr_k$ (k=1) from the last solution to the first solution. If no solution which has been assigned $Fr_k$ dominates F*(i), then F*(i) is assigned $Fr_k$. If any solution which has been assigned $Fr_k$ dominates F*(i), k increases by 1. If k is not greater than the length of set Fr, solution F*(i) may be compared with the solutions which have been assigned $Fr_k$ from the last solution to the first solution. If k is greater than the length of set Fr, it means there is no front-ranking $Fr_k$ in set Fr. Hence, front-ranking $Fr_k$ is added in set Fr, and F*(i) is assigned $Fr_k$. This procedure continues until all the solutions are assigned front rankings. Finally, Pareto sorted population $F_{Fr}$ is obtained.

Figure 9:
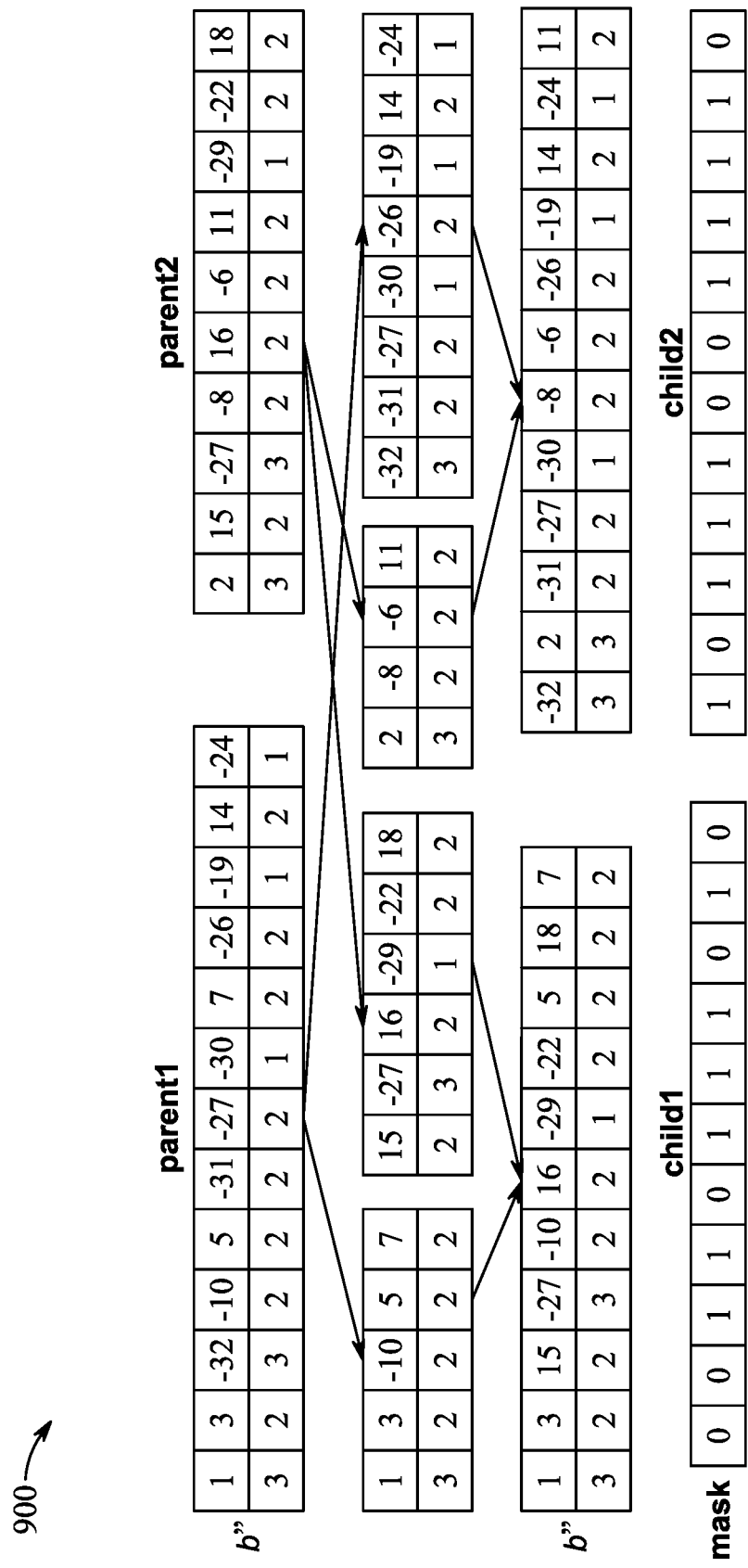
FIG. 9 is an exemplary flowchart for a new individual generation phase of the implementation of the IMDBO algorithm for crossover operator of b", according to certain embodiments.

Further, for the step 508 of the flowchart 500, the new individual generation phase starts from the current clusters and tries to search for new individuals. Differing from the basic Brainstorm optimisation (BSO), the crossover operator and the mutation operator are applied to search new individuals for clusters due to the discrete feature of the problem encountered herein. From the double-phase heuristic, it may be concluded that a feasible disassembly solution only depends on b". Therefore, b" is crossed in the crossover process. Referring to FIG. 9, illustrated is a flow diagram 900 for the new individual generation phase. As shown in the flow diagram 900, the crossover operator of b" combines the b" in parent1 and the b" in parent2 to the b" of child1 and child2. Disassembly tasks 1, 3, −10, 5, and 7 in disassembly sequence represent tasks of ballpoint pen 1, and −32, −31, −27, −30, −26, −19, 14, and −24 represent tasks from ballpoint pen 2, where the negative sign indicates that the task is performed on the exit side of the robotic U-shaped disassembly line. The disassembly sequences of parent1 and parent2 are divided into ballpoint pen 1's disassembly sequence and ballpoint pen 2's disassembly sequence, respectively. A masked array with the same length as the disassembly sequence composed of the disassembly sequence of ballpoint pen 1 from parent1 and the disassembly sequence of ballpoint pen 2 from parent2 are randomly generated. When the mask is equal to 0, child1 copies the disassembly task of parent1's ballpoint pen 1. When the mask is equal to 1, child1 copies the disassembly task of parent 2's ballpoint pen 2. When the copy of any sub disassembly sequence is finished, the tasks in the other sub disassembly sequence are added to the disassembly sequence of child1 in turn. The disassembly sequence generation method of child2 is similar to that of child1, and thus not described in detail herein for the brevity of the present disclosure.

Figure 10:
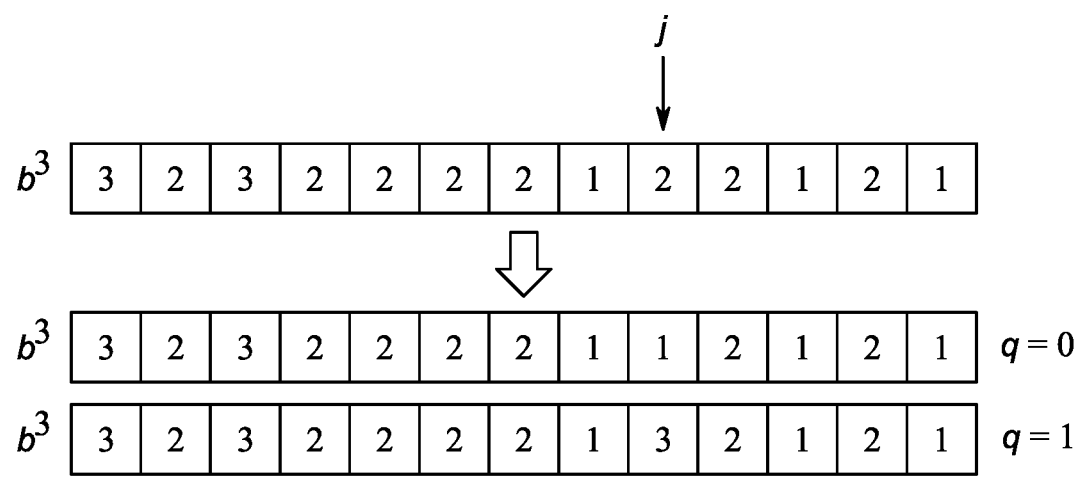
FIG. 10 is an exemplary flowchart for a new individual generation phase of the implementation of the IMDBO algorithm for mutation operator of $b^3$ in b", according to certain embodiments.
Figure 11A:
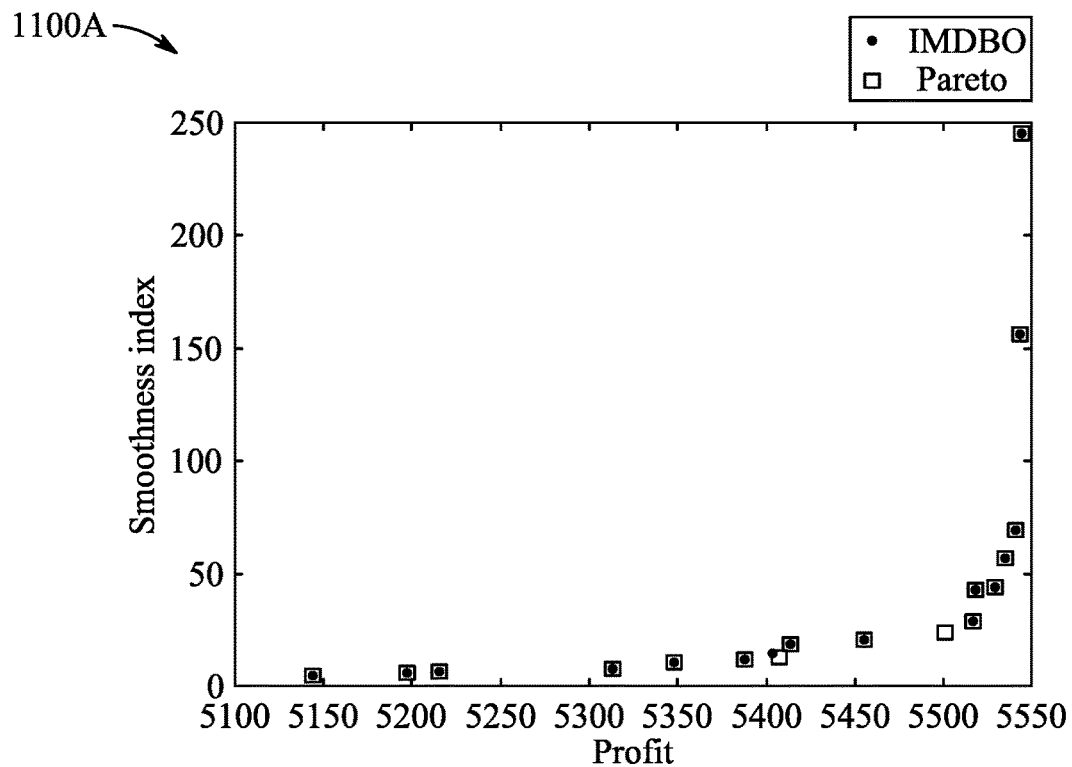
FIG. 11A is an exemplary graph generated by plotting a Pareto front and an approximate Pareto front obtained by IMDBO, according to certain embodiments.
Figure 11B:
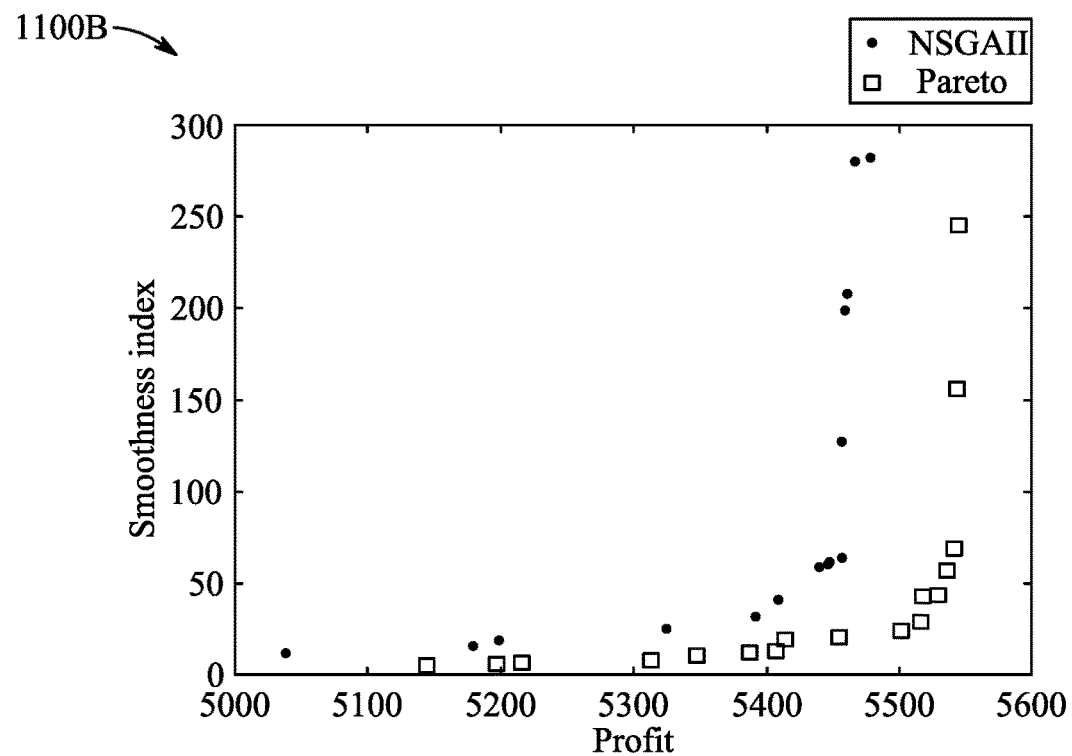
FIG. 11B is an exemplary graph generated by plotting a Pareto front and an approximate Pareto front obtained by NSGAII, according to certain embodiments.
Figure 11C:
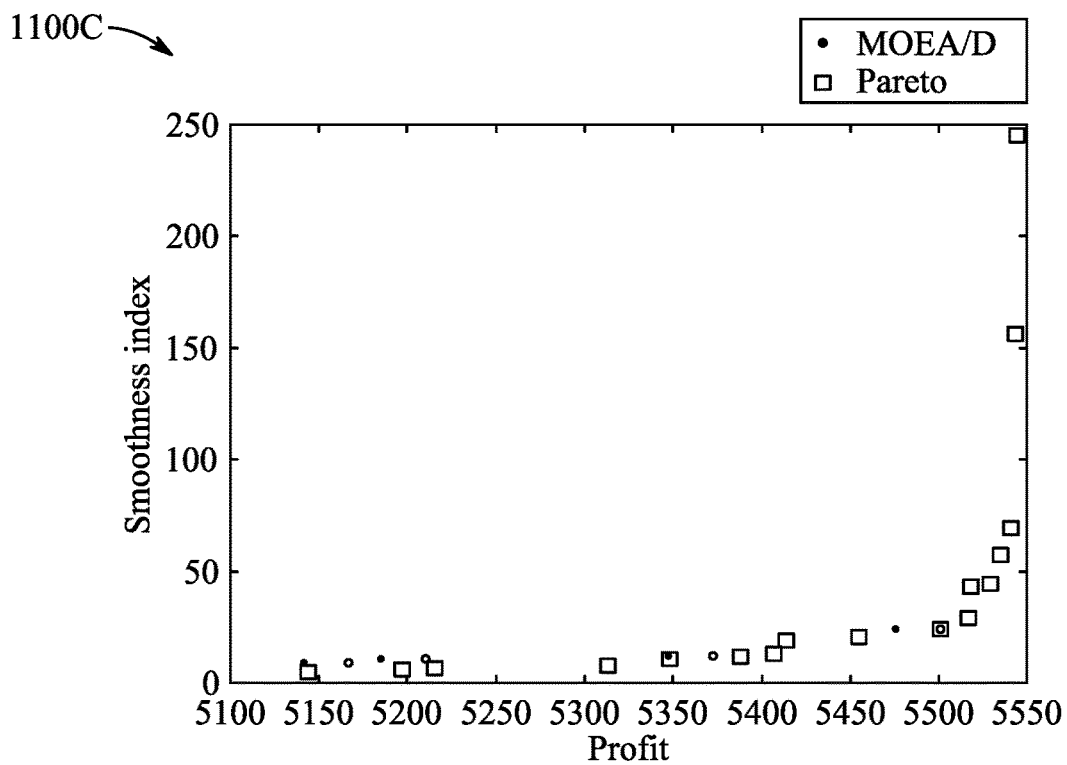
FIG. 11C is an exemplary graph generated by plotting a Pareto front and an approximate Pareto front obtained by MOEA/D, according to certain embodiments.
Figure 11D:
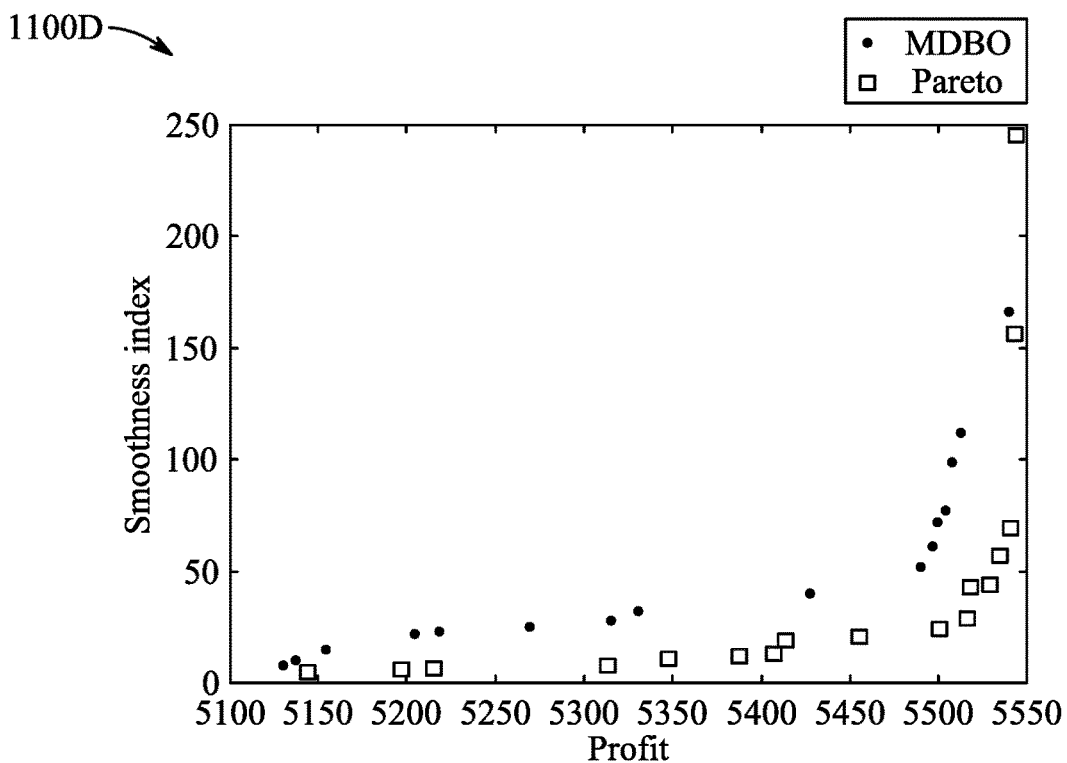
FIG. 11D is an exemplary graph generated by plotting a Pareto front and an approximate Pareto front obtained by MDBO, according to certain embodiments.
Figure 11E:
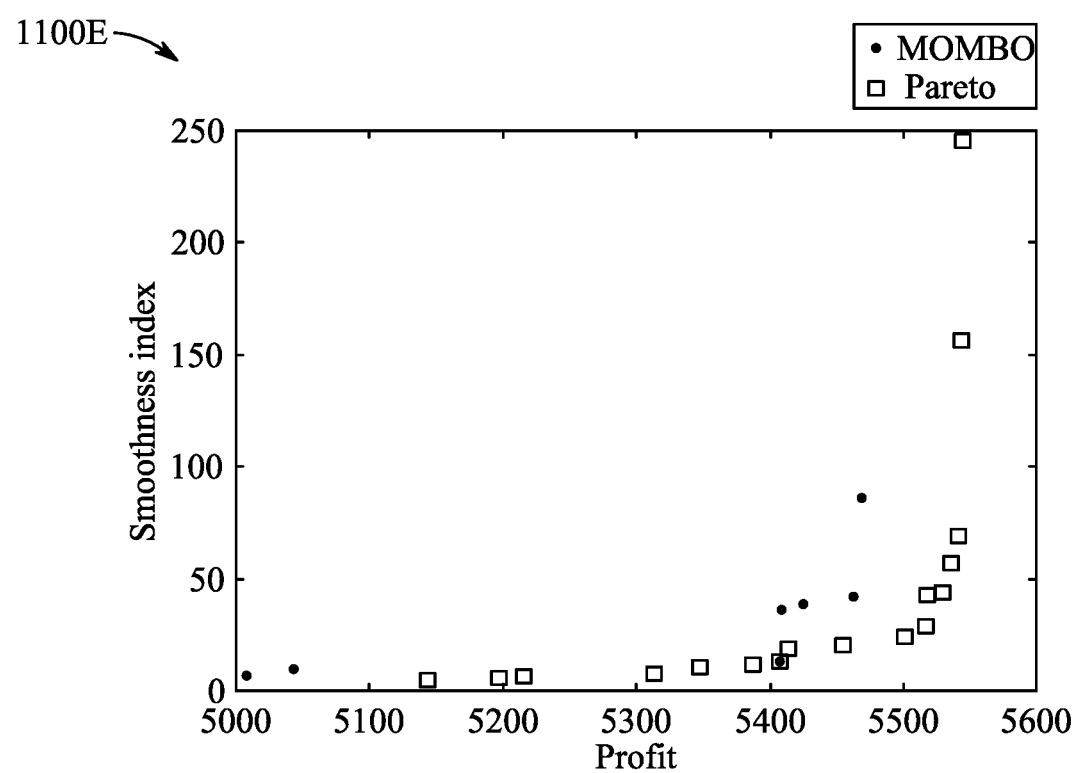
FIG. 11E is an exemplary graph generated by plotting a Pareto front and an approximate Pareto front obtained by MOMBO, according to certain embodiments.

It may be understood that due to some difficult feasibility problems, herein, only the mutation operation of the $b^3$ in b" is considered. For the convenience of description, the number of robot types R is set to 3. As shown in a flow diagram 1000 of FIG. 10, one random position j in $b^3$ is an $r_2$ robot, keeping other positions in $b^3$ unchanged and changing robot type 2 to another robot type. When q=0, 2 becomes 1, and when q=1, 2 becomes 3.

Further, for the step 510 of the flowchart 500, the selection phase is utilized to preserve the better individuals among all the individuals found so far. To accelerate the convergence of the algorithm, the first |F| individuals in the combination of the new individual set and F are chosen as the next population by FNS and CD methods.

Further, for the step 512 of the flowchart 500, the external archive set A is constructed to store the obtained non-dominated solutions. Firstly, it is initialized by the initial population based on the Pareto rule. After each iteration is finished, the external archive set A is updated by using the current population based on the Pareto rule to ensure that all non-dominated solutions in the external archive set A are always the current global non-dominated solutions. If the size of the external archive set A is great than |F|, the top |F| solutions with the largest crowding distance are selected by the CD method and retained to the external archive set A, and the rest of the solutions in the external archive set A are removed.

Furthermore, to test the performance of the IMDBO algorithm, eight types of EOL products as test instances are select. These products include a ballpoint pen 1 (product 1), a hammer drill (product 2), a washing machine (product 3), a radio (product 4), a ballpoint pen 2 (product 5), a sample product (product 6), a hand light (product 7), and a simplified copy machine (product 8). By combining these products together, thirty different scale instances for bi-objective MMUD design are constructed. Table II below lists the instance index, instance scale, product combination, and task number of these thirty instances. The same disassembly line configuration is suitable for all of the listed test instances. The disassembly line consists of several workstations, each of which has up to three robots. Different workstations can be equipped with the same type of robots, and three types of candidate robots can be installed on the disassembly line on demand.

TABLE II

DETAILED INFORMATION OF THIRTY INSTANCES

| Instance | Scale | Products | Tasks |
|---|---|---|---|
| SI1 | Small | 1, 2 | 59 |
| SI2 | Small | 1, 3 | 26 |
| SI3 | Small | 1, 5 | 33 |
| SI4 | Small | 1, 6 | 36 |
| SI5 | Small | 1, 7 | 23 |
| SI6 | Small | 1, 8 | 45 |
| SI7 | Small | 1, 3, 5 | 56 |
| SI8 | Small | 1, 3, 6 | 46 |
| SI9 | Small | 1, 3, 7 | 36 |
| SI10 | Small | 1, 6, 7 | 46 |
| MI1 | Medium | 1, 2, 3, 5 | 92 |
| MI2 | Medium | 1, 2, 3, 6 | 95 |
| MI3 | Medium | 1, 2, 3, 7 | 82 |
| MI4 | Medium | 1, 2, 3, 8 | 104 |
| MI5 | Medium | 1, 2, 4, 5 | 109 |
| MI6 | Medium | 1, 2, 4, 7 | 99 |
| MI7 | Medium | 1, 2, 4, 8 | 121 |
| MI8 | Medium | 1, 2, 3, 4, 5 | 122 |
| MI9 | Medium | 1, 2, 3, 6, 7 | 105 |
| MI10 | Medium | 1, 2, 4, 5, 7 | 119 |
| LI1 | Large | 1, 2, 3, 4, 5, 6 | 145 |
| LI2 | Large | 1, 2, 3, 4, 5, 7 | 132 |
| LI3 | Large | 1, 2, 3, 4, 5, 8 | 154 |
| LI4 | Large | 1, 2, 3, 4, 6, 7 | 135 |
| LI5 | Large | 1, 2, 3, 4, 6, 8 | 157 |
| LI6 | Large | 1, 2, 4, 5, 6, 8 | 164 |
| LI7 | Large | 1, 2, 4, 5, 7, 8 | 151 |
| LI8 | Large | 1, 2, 3, 4, 6, 7, 8 | 167 |
| LI9 | Large | 1, 2, 4, 5, 6, 7, 8 | 174 |
| LI10 | Large | 1, 2, 3, 4, 5, 6, 7, 8 | 187 |

Further, the performance of IMDBO on the MMUD design is compared with that of NSGA-II (See: K. Deb, A. Pratap, S. Agarwal, and T. Meyarivan, "*A fast and elitist multiobjective Genetic Algorithm: NSGA-I*," IEEE Trans. Evolut. Comput., vol. 6, no. 2, pp. 182-197, 2002); MOEA/D (See: Q. F. Zhang and H. Li, "*MOEA D: A multiobjective evolutionary algorithm based on decomposition*," IEEE Trans. Evolut. Comput., vol. 11, no. 6, pp. 712-731, 2007); MDBO (See: K. Wu, X. W. Guo, M. C. Zhou, S. X. Liu, and L. Qi, "*Multi-objective discrete brainstorming optimizer for stochastic disassembly line balancing problem subject to disassembly failure,*" 2020 IEEE International Conference on Systems, Man, and Cybernetics (SMC), 2020); and MOMBO (See: G. B. Qin, X. W. Guo, M. C. Zhou, S. X. Liu, and L. Qi, "*Multi-objective discrete migratory bird optimizer for stochastic disassembly line balancing problem,*" 2020 IEEE International Conference on Systems, Man, and Cybernetics (SMC), 2020); each incorporated herein by reference in its entirety. In the present implementation, all algorithms are implemented with Java 13, and all code runs on eight Intel Core i5 1.6 GHz processors with 8 GB RAM each. Performance is measured by calculating a coverage indicator (CI), an inverted generational distance (IGD), and a hypervolume indicator (HI). These three indicators reflect the performance of a solution set in terms of convergence, uniformity, and spread. In general, a solution set with a higher CI value or a lower IGD value or a higher HI value is better. Constructing a Pareto front and setting a reference point are key steps to calculate IGD and HI respectively. In the present disclosure, the set of non-dominated solutions obtained by all algorithms in all runs are combined to approximate the Pareto front and set the reference point to (1,1). Additionally, the present disclosure employs a one-tailed t-test approach to further compare the performance of the algorithms, where the degree of freedom and level of significance are set to 38 and 0.05, respectively. Each algorithm has a large number of parameters to set up in advance, and these parameters will affect the performance of the algorithm. Following common practices of existing literatures, the population number, iteration number, crossover probability, and mutation probability are set to 100, 500, 1, and 0.3 respectively. In addition to these four parameters, the algorithms MDBO, IMDBO, and MOEA/D include some special parameters. More specifically, the four probabilities for MDBO and IMDBO are set to 0.2, 0.8, 0.5, and 0.4, respectively. The weight parameter and neighborhood size of MOEA/D are set to 99 and 10, respectively. Other parameters related to the calculation of objective function are set as follows: $c_i$=0.03, $e_i$=0.05, $T_i$=30, R=3.

Furthermore, all algorithms run 20 times.

Further, each instance is disassembled on the U-shaped disassembly line (as employed in the present disclosure) and linear disassembly line (as conventionally known), and the IMDBO algorithm is used to solve 20 times. For details of the test results, please visit http://bluehawk.monmouth.edu/~jwang/disassemblyline.html. Here we only give the statistics of the results:

In general, the U-shaped disassembly line usually has a higher disassembly profit or a lower smoothness index than the linear disassembly line. Out of the thirty instances, the results of the U-shaped disassembly line in twenty instances are better than that of the linear disassembly line, and the results of the U-shaped disassembly line in only instances MI8, LI1, LI4, LI5, and LI10 are worse than that of the linear disassembly line. The reason is that the task allocation of the U-shaped disassembly line is more flexible than that of the linear disassembly line.

The IMDBO algorithm outputs larger CI values than the other four competitors. Especially, the IMDBO algorithm outperforms MOEA/D in all instances in terms of CI. The IMDBO algorithm obtains smaller IGD values in most instances. The IMDBO algorithm outperforms MOEA/D, MDBO, and MOMBO in all instances in terms of IGD. In these thirty instances, the biggest gap between the IMDBO algorithm and the best one is only 12.875%. The IMDBO algorithm gets the best HI values on most instances than its peers. Especially, the IMDBO algorithm outperforms MOEA/D, MDBO, and MOMBO in all instances in terms of IGD. In these thirty instances, the biggest gap between the IMDBO algorithm and the best one is only 3.727%. In summary, the IMDBO statistics show an improvement over NSGAII, MOEA/D, MDBO, and MOMBO on all the thirty instances in terms of CI, IGD, and HI values.

FIGS. 11A-11E further demonstrate the above observations by plotting the Pareto front and approximate Pareto front obtained by IMDBO (as shown in graph 1100A), NSGAII (as shown in graph 1100B), MOEA/D (as shown in graph 1100C), MDBO (as shown in graph 1100D), and MOMBO (as shown in graph 1100E), respectively, on a representative instance SI2. It may be understood that in multi-objective optimization, the Pareto front is a set of solutions that represents the optimal trade-offs between the different objectives of the problem. Solutions that are farther from the Pareto front are less efficient in the sense that they do not make optimal use of the available resources. Herein, the approximate Pareto front obtained by IMDBO combines the approximation Pareto fronts of five algorithms. Although this approximate Pareto front may not be an exact representation of a real Pareto front, that does not have any impact on the algorithm performance comparison results. It may be seen from the graphs 1100A-1100E that the approximate Pareto front obtained by IMDBO is closer to the real Pareto front as compared to other algorithms, and thus represents the "best" possible trade-offs between the different objectives of the problem.

Figure 12:
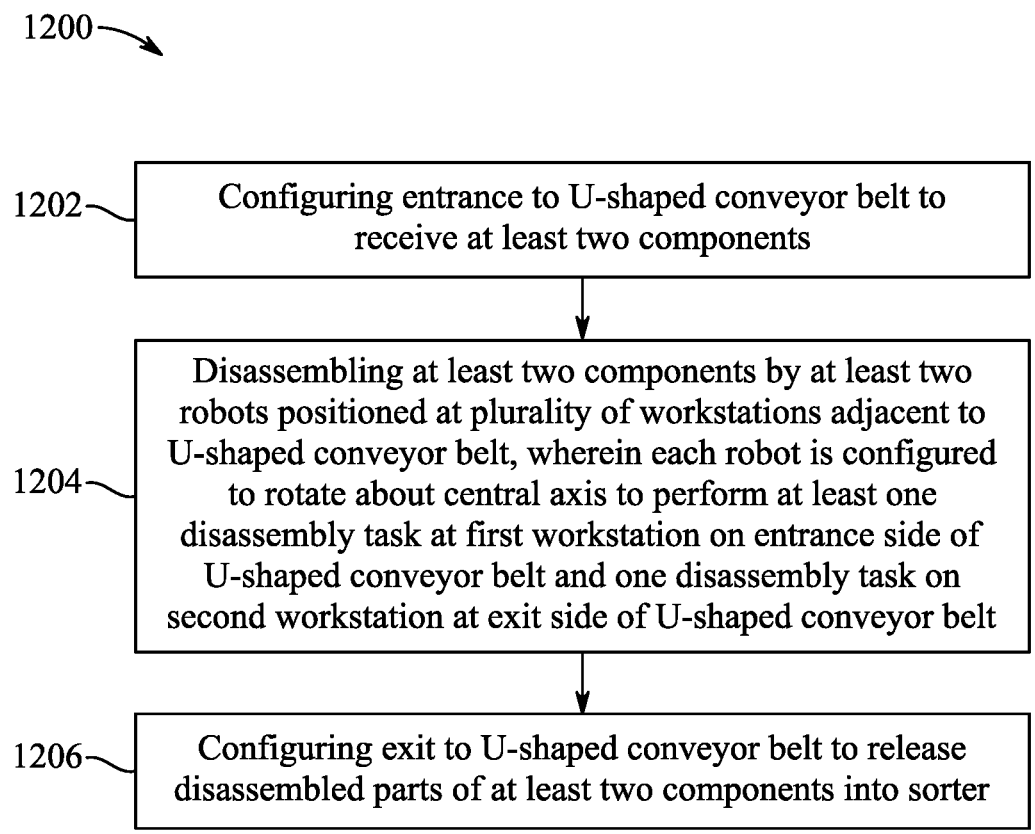
FIG. 12 is an exemplary flowchart for a method for disassembling components on the multi-robotic U-shaped disassembly line, according to certain embodiments.

The present disclosure further provides a method for performing the disassembling operation. Referring to FIG. 12, illustrated is an exemplary flowchart of a method 1200 for disassembling components (such as, the components 126) on a multi-robotic U-shaped disassembly line (such as, the multi-robotic U-shaped disassembly line 100). Various aspects and variants disclosed above with respect to the multi-robotic U-shaped disassembly line 100 apply mutatis mutandis to the present method 1200.

At step 1202, the method 1200 includes configuring the entrance portion 104 to the U-shaped conveyor belt 102 to receive the at least two components 126. At step 1204, the method 1200 includes disassembling the at least two components 126 by the at least two robots 122 positioned at the plurality of workstations 120 adjacent to the U-shaped conveyor belt 102. Herein, each robot 122 is configured to rotate about the central axis to perform at least one disassembly task at one side of the workstation 120 on the first portion 106 of the U-shaped conveyor belt 102 and one disassembly task on the second portion 112 of the workstation 120 at near the exit portion 116 of the U-shaped conveyor belt 102. At step 1206, the method 1200 includes configuring the exit portion 116 to the U-shaped conveyor belt 102 to release the disassembled parts 128 of the at least two components 126 into the sorter 118.

As discussed, the multi-robotic U-shaped disassembly line 100 includes the series of workstations 120. Multiple robots 122 may be used on each workstation 120. Each of the plurality of workstations 120 provides a designated area for the corresponding one or more of the plurality of robots 122 to perform their designated tasks and contribute to the overall operation of the multi-robotic U-shaped disassembly line 100. In aspects of the present disclosure, each robot of the plurality of robots 122 is configured to perform at least two disassembly tasks (as discussed later in more detail). Specifically, each robot of the plurality of robots 122 is configured to rotate about a central axis to perform at least one disassembly task on the first portion 106 and one disassembly task on the second portion 112 of the U-shaped conveyor belt 102. In the multi-robotic U-shaped disassembly line 100, the robots 122 perform different tasks belonging to the same component or different components 126 at the same time. Further multiple components 126 may be disassembled simultaneously in the multi-robotic U-shaped disassembly line 100 to meet the demands of high efficiency and the task precedence and conflict relations of each component 126. The sorter 118 receives the disassembled parts 128 from the exit portion 116. With the entrance portion 104 and the exit portion 116 (as well as the sorter 118) being on the same side in the U-shaped conveyor belt 102, the entrance end 108 of the at least two components 126 to be disassembled and the exit end 114 of the disassembled parts 128 are also on the same side, which, as may be appreciated, can reduce the logistics cost.

In some aspects of the present disclosure, the method 1200 also includes receiving, from the user interface 132, the input 'I' of the component number for each component 126 located on the entrance portion 104 of the U-shaped conveyor belt 102. The method 1200 further includes retrieving, by the computing device 134 at least one disassembly task for each component number. The computing device 134 is operatively connected to the U-shaped conveyor belt 102, the user interface 132 and the plurality of robots 122. The computing device 134 includes the circuitry, the at least one processor, and the memory comprising disassembly instructions for each component number, and the processor is configured to execute the disassembly instructions.

The method 1200 further includes assigning, by the computing device 134, each disassembly task to a robot 122 configured to perform the disassembly task. The method 1200 further includes actuating, by the computing device 134, the U-shaped conveyor belt 102 to move the components past the workstations 120. The method 1200 further includes commanding, by the computing device 134, each of the plurality of robots 122 to use the at least one tool 124 to perform at least one disassembly task upon at least one workstation 120 as the components 126 move to the workstation 120. The method 1200 further includes releasing the disassembled parts 128 of the at least two components 126 into the sorter 118.

In some aspects of the present disclosure, the method 1200 also includes generating, by the computing device 134, a set of drive signals which cause the U-shaped conveyor belt 102 to move the component 126 to a designated workstation 120 for a cycle time and past each workstation 120 from the entrance 104 to the exit 116 at a speed determined by the processor based on the disassembly instructions. For this purpose, the computing device 134 may be connected to a drive motor arrangement of the U-shaped conveyor belt 102 and may transmit the necessary drive signals to the drive motor arrangement in order to move the U-shaped conveyor belt 102 and transport the component 126 past each workstation 120 as per the defined cycle time in the disassembly instructions.

In some aspects of the present disclosure, the method 1200 also includes constructing, by calculations included in the disassembly instructions for performing a multi-objective discrete brainstorming optimization, an AND/OR graph 200A, 200B of the disassembly tasks for each component 126. The method 1200 further includes constructing the precedence and conflict matrix P of the disassembly tasks based on the AND/OR graph 200A, 200B. The method 1200 further includes constructing the succession matrix S of the disassembly tasks. The succession matrix, S, is configured to define a succession relationship of the disassembly tasks. The method 1200 further includes constructing the incidence matrix D configured to model a relationship between each component part 128 and each disassembly task and facilitate calculation of a profit of the disassembly.

In some aspects of the present disclosure, the method 1200 also includes wirelessly transmitting the AND/OR graph 200A, 200B, the precedence and conflict matrix P, the succession matrix S, and the incidence matrix D, by a communications device located within the computing device 134, to the server 136 configured with the external database 138. In some aspects of the present disclosure, the method 1200 also includes generating, by the processor, an initial population of the disassembly tasks based on the precedence and conflict matrix, P, the succession matrix, S, and the incidence matrix, D. The method 1200 further includes applying a Pareto rule to the initial population and initialize an external archive set A stored in the external database 138. The method 1200 further includes clustering the initial population by a non-dominated sorting calculation. The method 1200 further includes generating a next population by using crossover and mutation operations. The method 1200 further includes updating the next population by using a fast nondominated sorting (FNS) calculation and a crowding distance (CD) calculation. The method 1200 further includes applying the Pareto rule and the crowding distance (CD) calculations. The method 1200 further includes updating an external archive set A stored in the external database 138. In some aspects of the present disclosure, the method 1200 also includes calculating, by the processor, the profit of the disassembly (i.e., disassembly profit as described above). The method 1200 further includes calculating, by the processor, a smoothness index of the disassembly. The method 1200 further includes maximizing the profit of the disassembly and minimizing the smoothness index.

The present disclosure provides designing of the multi-robotic U-shaped disassembly line 100 (the MMUD system 100) and the method 1200 for disassembling components on the multi-robotic U-shaped disassembly line 100. The multi-robotic U-shaped disassembly line 100 is an effective way to deal with large-scale end-of-life products and plays a significant role in green and sustainable economy. The multi-robotic U-shaped disassembly line 100 may be used to improve efficiency and reduce the cost of disassembly. In the multi-robotic U-shaped disassembly line 100, the multiple robots 122 are used and assigned to each one of the workstations 120 to perform the disassembly tasks in parallel without precedence and conflict relationships, so that different types of end-of-life products may be disassembled on the U-shaped conveyor belt 102. The mathematical model is established to maximize the disassembly profit and minimize the smoothness index. The IMDBO algorithm optimizes the multi-robotic U-shaped disassembly line 100. The IMDBO algorithm is applied to a set of problem instances and compared with four classical multi-objective optimization algorithms. The experimental results show that the IMDBO algorithm of the present disclosure may achieve better performance in most instances.

Compared with the existing studies in DLBP, the MMUD system 100 of the present disclosure has major advantages over the conventional art in multiple respects. The MMUD system 100, as provided, is more practical than the traditional systems and is very suitable for the complex multi-product disassembly industry. The present disclosure formulates the mathematical model for the MMUD system 100 with the objectives being to maximize disassembly profit and minimize the smoothness index. The present disclosure provides the IMDBO algorithm to design the MMUD system 100. A triple-vector list structure is used to represent a solution, which uses the clustering algorithm to divide the population solutions into several clusters. In addition, the present disclosure presents a two-phase method to generate initial solution. An external archive set is constructed to store the obtained non-dominated solutions. to find Pareto solutions. The present disclosure also provides techniques to generate new set of test instances based on 8 AND/OR graphs of real-world EOL products. In the present disclosure, the effectiveness of the IMDBO algorithm on the MMUD design 100 is validated in comparison with four competitors, i.e., NSGA-II, MOEA/D, MDBO, and MOMBO.

The present disclosure may further allow for utilization of multiple skills robots, and for human-robot cooperation disassembly without any limitations. In some examples, the present disclosure may also optimize energy consumption problem of the robots 122. In some aspects of the present disclosure, the performance of the IMDBO algorithm may be combined with deep learning and reinforce learning to improve its performance. The present disclosure may also be applicable for more complex disassembly lines, for instance, parallel disassembly line and two-side disassembly line. For instance, such complex disassembly lines may be modelled and analyzed by, e.g., Petri nets and workflow technologies without departing from the spirit and the scope of the present disclosure.

The first embodiment of the present disclosure is illustrated with respect to FIG. 1 through FIG. 11. The first embodiment describes the multi-robotic U-shaped disassembly line 100, comprising: a U-shaped conveyor belt 102 including an entrance end 108 and an exit end 114, an entrance portion 104 at the entrance end 108, a first portion 106 connected to the entrance portion 104, a curved portion 110, a second portion 112 connected to an exit portion 116, wherein the entrance portion 104 is configured to receive at least two components 126 and the exit portion 116 is configured to release disassembled parts 128 of the at least two components 126; a plurality of robots 122, wherein each robot 122 is configured to perform at least two disassembly tasks, wherein the plurality of robots 122 includes at least two robots 122; a plurality of workstations 120, wherein each workstation 120 is located along at least one of the first portion 106 and the second portion 112, wherein each workstation 120 includes at least two robots 122, wherein each robot 122 is configured to rotate about the central axis to perform at least one disassembly task on the first portion 106 and one disassembly task on the second portion 112; a plurality of tools 124, wherein each workstation 120 includes at least one tool 124; the user interface 132 configured to receive the input 'I' of the component number; the internal database 130 configured with records comprising the plurality of component numbers and constituent part numbers for each component number; a computing device 134 connected to the U-shaped conveyor belt 102, to each robot 122, to the user interface 132 and to the internal database 130, the computing device 134 including circuitry, at least one processor, and the memory comprising disassembly instructions for each component number, wherein the at least one processor is configured to execute the disassembly instructions to: receive, from the user interface 132, the input 'I' of the component number for each component 126 located on the entrance portion 104 of the U-shaped conveyor belt 102; retrieve, from the memory, at least one disassembly task for each component number; assign each disassembly task to the robot 122 configured to perform the disassembly task; actuate the U-shaped conveyor belt 102 to move the components 126 past the workstations 120; and command each of the plurality of robots 122 to use the at least one tool 124 to perform at least one disassembly task upon at least one workstation 120 as the components 126 move to the workstation 120; and a sorter 118 configured to receive the disassembled parts 128 of the at least two components 126 at the exit 116.

The multi-robotic U-shaped disassembly line 100, wherein the length 'L' of each workstation 120 is configured to hold up to three robots 122, wherein the robots 122 are positioned such that: when there is only one robot 122 at the workstation 120, the robot 122 is positioned to face the middle of the length 'L' of the workstation 120; when there are two robots 122 at the workstation 120, the first robot 122a is positioned to face the center of the first half length of the workstation 120, and the second robot 122b is positioned adjacent to the first robot 122a to face the center of the second half length of the workstation 120; when there are three robots 122 at the workstation 120, the first robot 122a is positioned to face the center of the first one third length of the workstation 120, the second robot 122b is positioned adjacent to the first robot 122a to face the center of the second one third length of the workstation 120, and the third robot 122c is positioned adjacent to the second robot 122b to face the center of the third one third length of the workstation 120; and each robot 122 is further positioned so as to face one side of the workstation 120 located on the first portion 106 and to face other side of the workstation 120 located on the second portion 112 after rotation about its central axis.

The multi-robotic U-shaped disassembly line 100, wherein the computing device 134 is configured to generate the set of drive signals which cause the U-shaped conveyor belt 102 to move the component 126 to the designated workstation 120 for the cycle time and past each workstation 120 from the entrance 104 to the exit 116 at the speed determined by the processor based on the disassembly instructions.

The multi-robotic U-shaped disassembly line 100, wherein the disassembly instructions further include calculations for performing the multi-objective discrete brainstorming optimization, wherein the processor is configured to execute the calculations to: construct the AND/OR graph 200A, 200B of the disassembly tasks for each component 126; construct the precedence and conflict matrix, P, of the disassembly tasks based on the AND/OR graph 200A, 200B; construct the succession matrix, S, of the disassembly tasks, wherein the succession matrix, S, is configured to define the succession relationship of the disassembly tasks; and construct the incidence matrix, D, configured to model the relationship between each component part 128 and each disassembly task and facilitate calculation of the profit of the disassembly.

The multi-robotic U-shaped disassembly line 100, wherein the computing device 134 is configured to wirelessly transmit the AND/OR graph 200A, 200B, the precedence and conflict matrix P, the succession matrix S, and the incidence matrix D to the server 136, wherein the server 136 is configured with the external database 138.

The multi-robotic U-shaped disassembly line 100, wherein the processor is further configured to execute the calculations to: generate the initial population of the disassembly tasks based on the precedence and conflict matrix, P, the succession matrix, S, and the incidence matrix, D; apply the Pareto rule to the initial population and initialize the external archive set the stored in the external database 138; cluster the initial population by the non-dominated sorting calculation; generate the next population by using crossover and mutation operations; update the next population by using the fast nondominated sorting (FNS) calculation and the crowding distance (CD) calculation; and apply the Pareto rule and the crowding distance (CD) calculations to update the external archive set A.

The multi-robotic U-shaped disassembly line 100, wherein the processor is further configured to execute the calculations to: maximize the disassembly profit and minimize the smoothness index.

The second embodiment of the present disclosure is illustrated with respect to FIG. 12. The second embodiment describes the method 1200 for disassembling components 126 on the multi-robotic U-shaped disassembly line 100, comprising: configuring an entrance 104 of the U-shaped conveyor belt 102 to receive at least two components 126; disassembling the at least two components 126 by at least two robots 122 positioned at the plurality of workstations 120 adjacent to the U-shaped conveyor belt 102, wherein each robot 122 is configured to rotate about the central axis to perform at least one disassembly task at one side of the workstation 120 on the entrance side 108 of the U-shaped conveyor belt 102 and one disassembly task on other side of the workstation 120 at the exit side 114 of the U-shaped conveyor belt 102; configuring an exit portion 116 of the U-shaped conveyor belt 102 to release disassembled parts 128 of the at least two components 126 into the sorter 118.

The method 1200 further comprising: receiving, from the user interface 132, an input 'I' of a component number for each component 126 located at the entrance portion 104; retrieving, by a computing device 134 operatively connected to the U-shaped conveyor belt 102, the user interface 132 and plurality of robots 122, the computing device 134 including the circuitry, at least one processor, and a memory comprising disassembly instructions for each component number, wherein the processor is configured to execute the disassembly instructions, at least one disassembly task for each component number; assigning, by the computing device 134, each disassembly task to a robot configured to perform the disassembly task; actuating, by the computing device 134, the U-shaped conveyor belt 102 to move the components 126 past the workstations 120; commanding, by the computing device 134, each of the plurality of robots 122 to use at least one tool 124 to perform at least one disassembly task upon at least one workstation 120 as the components 126 move to the workstation 120; and releasing the disassembled parts 128 of the at least two components 126 into the sorter 118.

The method 1200 further comprising: generating, by the computing device 134, the set of drive signals which cause the U-shaped conveyor belt 102 to move the component 126 to the designated workstation 120 for the cycle time and past each workstation 120 from the entrance 104 to the exit 116 at the speed determined by the processor based on the disassembly instructions.

The method 1200 further comprising: constructing, by calculations included in the disassembly instructions for performing the multi-objective discrete brainstorming optimization, the AND/OR graph 200A, 200B of the disassembly tasks for each component 126; constructing the precedence and conflict matrix P of the disassembly tasks based on the AND/OR graph 200A, 200B; constructing the succession matrix S of the disassembly tasks, wherein the succession matrix, S, is configured to define the succession relationship of the disassembly tasks; and constructing the incidence matrix D configured to model the relationship between each component part 128 and each disassembly task and facilitate calculation of the profit of the disassembly.

The method 1200 further comprising: wirelessly transmitting the AND/OR graph 200A, 200B, the precedence and conflict matrix P, the succession matrix S, and the incidence matrix D, by the communications device located within the computing device 134, to the server 136 configured with the external database 138.

The method 1200 further comprising: generating, by the processor, the initial population of the disassembly tasks based on the precedence and conflict matrix, P, the succession matrix, S, and the incidence matrix, D; applying the Pareto rule to the initial population and initialize the external archive set the stored in the external database 138; clustering the initial population by the non-dominated sorting calculation; generating the next population by using crossover and mutation operations; updating the next population by using the fast nondominated sorting (FNS) calculation and the crowding distance (CD) calculation; applying the Pareto rule and the crowding distance (CD) calculations; and updating the external archive set the stored in the external database 138.

The method 1200 further comprising: calculating, by the processor, the profit of the disassembly, calculating, by the processor, the smoothness index of the disassembly; and maximizing the profit of the disassembly and minimizing the smoothness index.

The third embodiment of the present disclosure describes a non-transitory computer readable medium having disassembly instructions stored therein that, when executed by one or more processors, cause the one or more processors to perform the method 1200 for disassembling components 126 on the multi-robotic U-shaped disassembly line 100, comprising: configuring an entrance portion 104 to the U-shaped conveyor belt 102 to receive at least two components 126; disassembling the at least two components 126 by at least two robots 122 positioned at the plurality of workstations 120 adjacent to the U-shaped conveyor belt 102, wherein each robot 122 is configured to rotate about the central axis to perform at least one disassembly task at one side of the workstation 120 adjacent to a first portion 106 of the U-shaped conveyor belt 102 connected between the entrance portion and a curved portion of the U-shaped conveyor belt and to perform at least one disassembly task on a second portion of the workstation 120 adjacent to an exit portion 116 of the U-shaped conveyor belt 102; configuring the exit portion 116 of the U-shaped conveyor belt 102 to release disassembled parts 128 of the at least two components 126 into a sorter 118.

The non-transitory computer readable medium method, further comprising: receiving, from the user interface 132, the input 'I' of the component number for each component 126 located on the entrance portion 104 of the U-shaped conveyor belt 102; retrieving from the memory at least one disassembly task for each component number; assigning each disassembly task to the robot 122 configured to perform the disassembly task; actuating the U-shaped conveyor belt 102 to move the components 126 past the workstations 120; commanding each of the plurality of robots 122 to use at least one tool 124 to perform at least one disassembly task upon at least one workstation 120 as the components 126 move to the workstation 120; and releasing the disassembled parts 128 of the at least two components 126 into the sorter 118.

The non-transitory computer readable medium method, further comprising: generating a set of drive signals which cause the U-shaped conveyor belt 102 to move the component 126 to the designated workstation 120 for the cycle time and past each workstation 120 from the entrance portion 104 to the exit portion 116 at the speed determined by the processor based on the disassembly instructions.

The non-transitory computer readable medium method, further comprising: constructing, by calculations included in the disassembly instructions for performing the multi-objective discrete brainstorming optimization, the AND/OR graph 200A, 200B of the disassembly tasks for each component 126; constructing the precedence and conflict matrix P of the disassembly tasks based on the AND/OR graph 200A, 200B; constructing the succession matrix S of the disassembly tasks, wherein the succession matrix, S, is configured to define the succession relationship of the disassembly tasks; and constructing the incidence matrix D configured to model the relationship between each component part 128 and each disassembly task and facilitate calculation of the profit of the disassembly.

The non-transitory computer readable medium method, further comprising: wirelessly transmitting the AND/OR graph 200A, 200B, the precedence and conflict matrix P, the succession matrix S, and the incidence matrix D to the server 136 configured with the external database 138.

The non-transitory computer readable medium method, further comprising: generating the initial population of the disassembly tasks based on the precedence and conflict matrix, P, the succession matrix, S, and the incidence matrix, D; applying the Pareto rule to the initial population and initialize the external archive set the stored in the external database 138; clustering the initial population by the non-dominated sorting calculation; generating the next population by using crossover and mutation operations; updating the next population by using the fast nondominated sorting (FNS) calculation and the crowding distance (CD) calculation; applying the Pareto rule and the crowding distance (CD) calculations; updating the external archive set the stored in the external database 138; calculating the profit of the disassembly, calculating the smoothness index of the disassembly; and maximizing the profit of the disassembly and minimizing the smoothness index.

Figure 13:
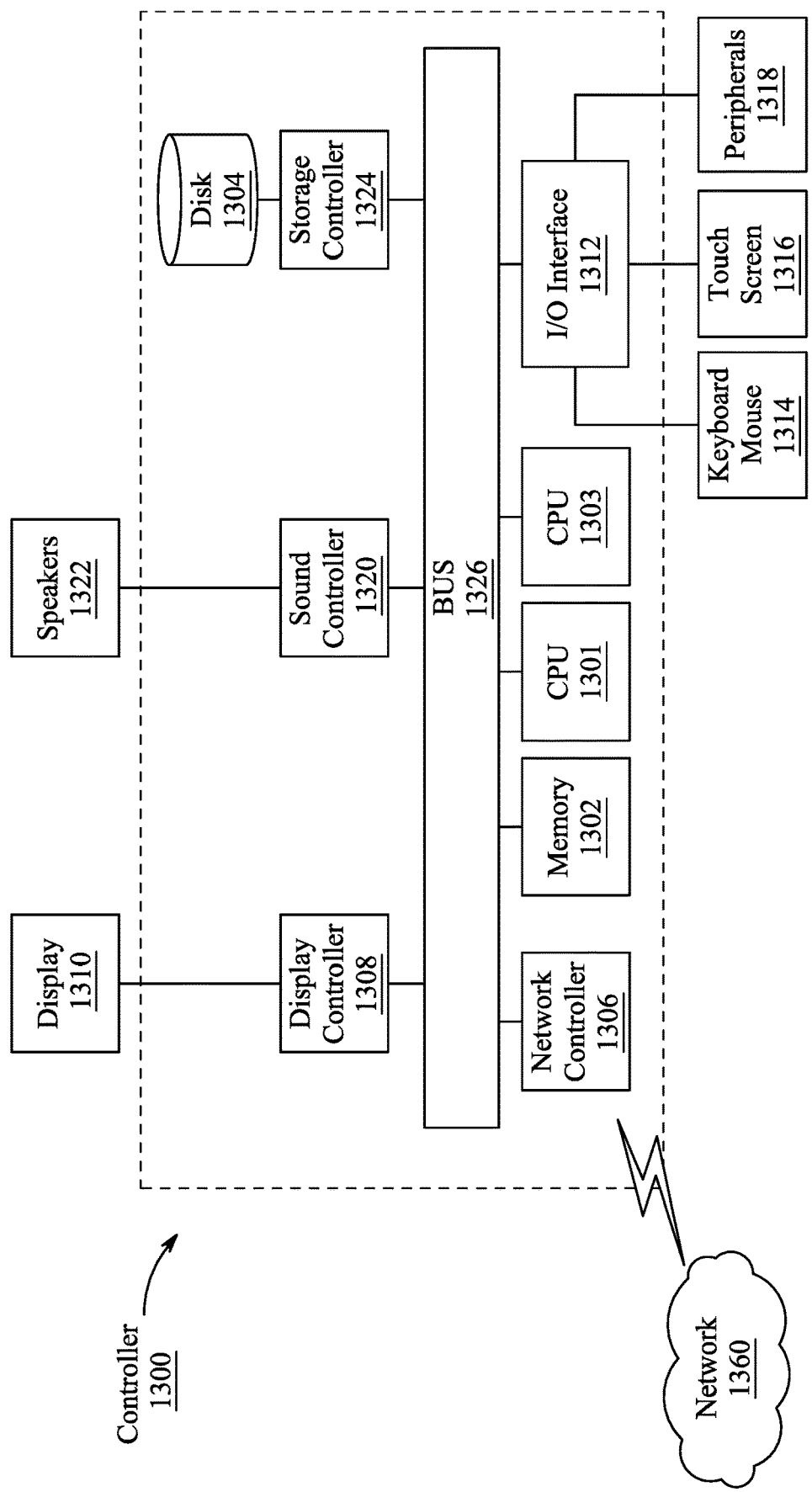
FIG. 13 is an illustration of a non-limiting example of details of computing hardware used in the computing device, according to certain embodiments.

Next, further details of the hardware description of the computing environment according to exemplary embodiments is described with reference to FIG. 13. In FIG. 13, a controller 1300 is described is representative of the computing device 134 of FIG. 1 in which the controller is a computing device which includes a CPU 1301 which performs the processes described above/below. The process data and instructions may be stored in memory 1302. These processes and instructions may also be stored on a storage medium disk 1304 (providing the internal database) such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, Microsoft Windows 11,UNIX, Solaris, LINUX, Apple MAC-OS and other systems known to those skilled in the art.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skill in the art would recognize. Further, CPU 1301, 1303 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
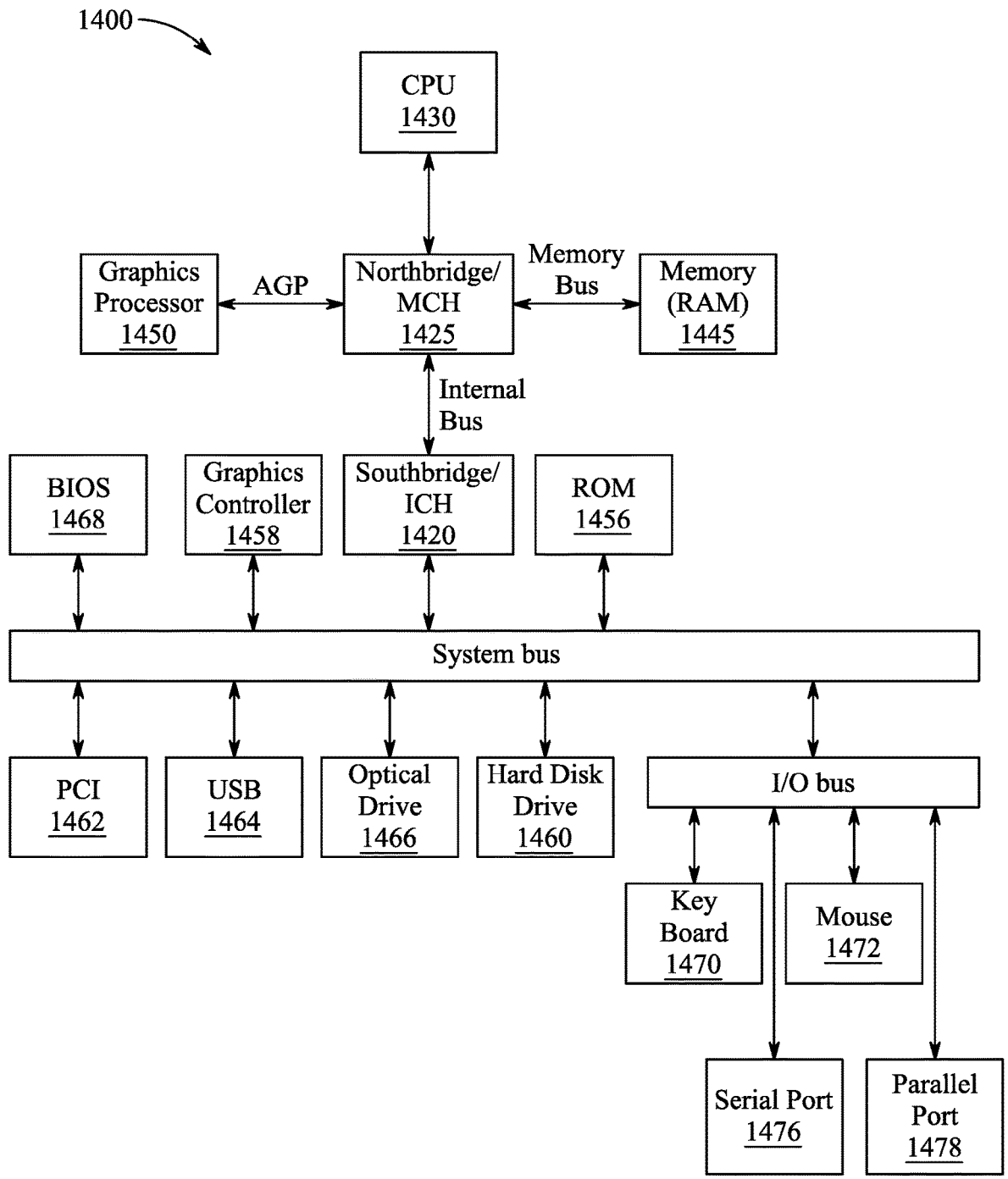
FIG. 14 is an exemplary schematic diagram of a data processing system used within the computing device, according to certain embodiments.

FIG. 14 shows a schematic diagram of a data processing system, according to certain embodiments, for performing the functions of the exemplary embodiments. The data processing system is a non-limiting example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU 1430 may contain one or more processors and even may be implemented using one or more heterogeneous processor systems.

Figure 15:
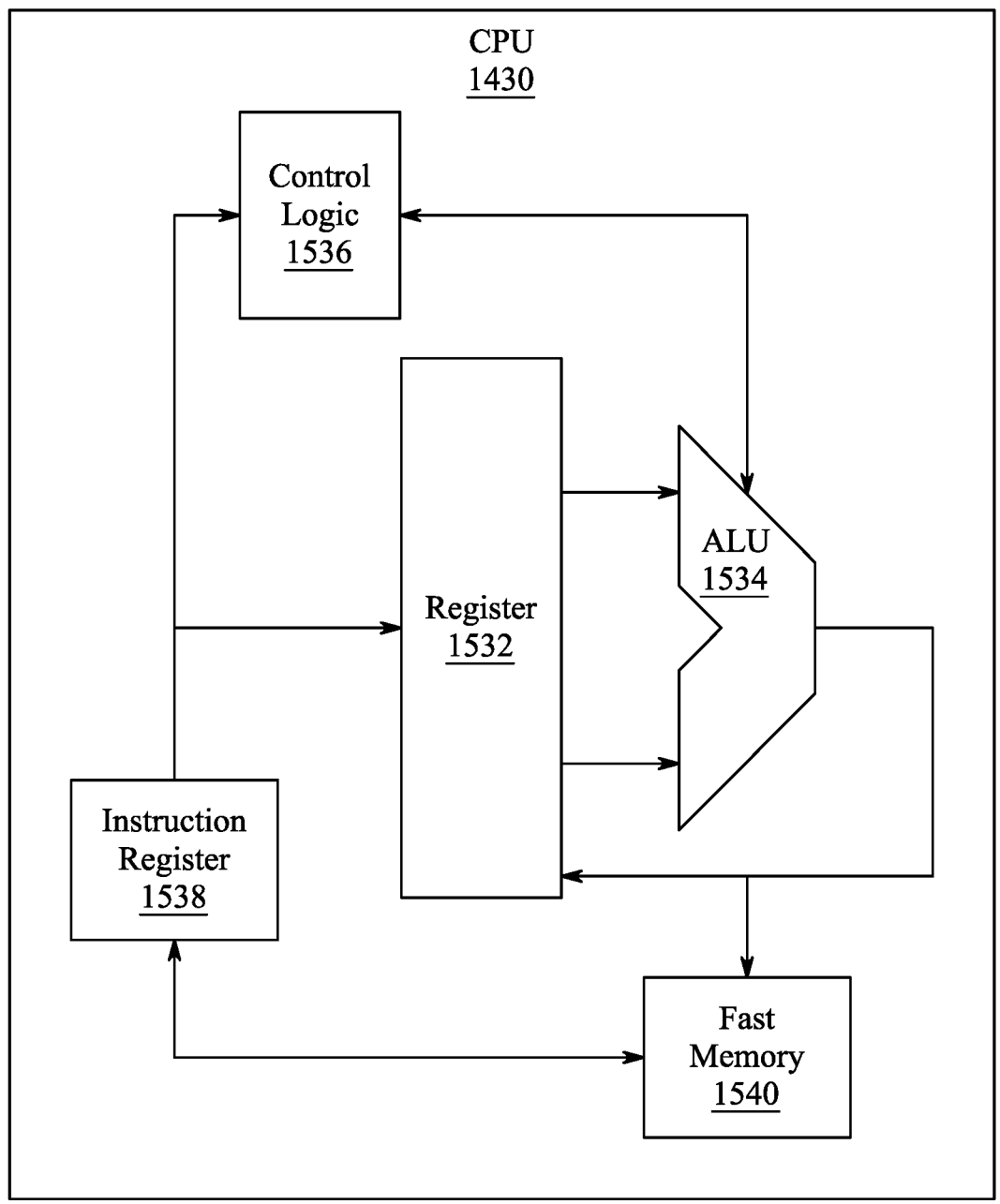
FIG. 15 is an exemplary schematic diagram of a processor used with the computing device, according to certain embodiments.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 1430. Part of the instructions can also be directed to the register 1532. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to the SB/ICH 1420 through a PCI bus 1462.

The PCI devices may include, for example, Ethernet adapters, add-in cards, and PC cards for notebook computers. The Hard disk drive 1460 and CD-ROM 1466 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bus through the I/O bus. Other peripherals and devices that can be connected to the SB/ICH

1420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 16:
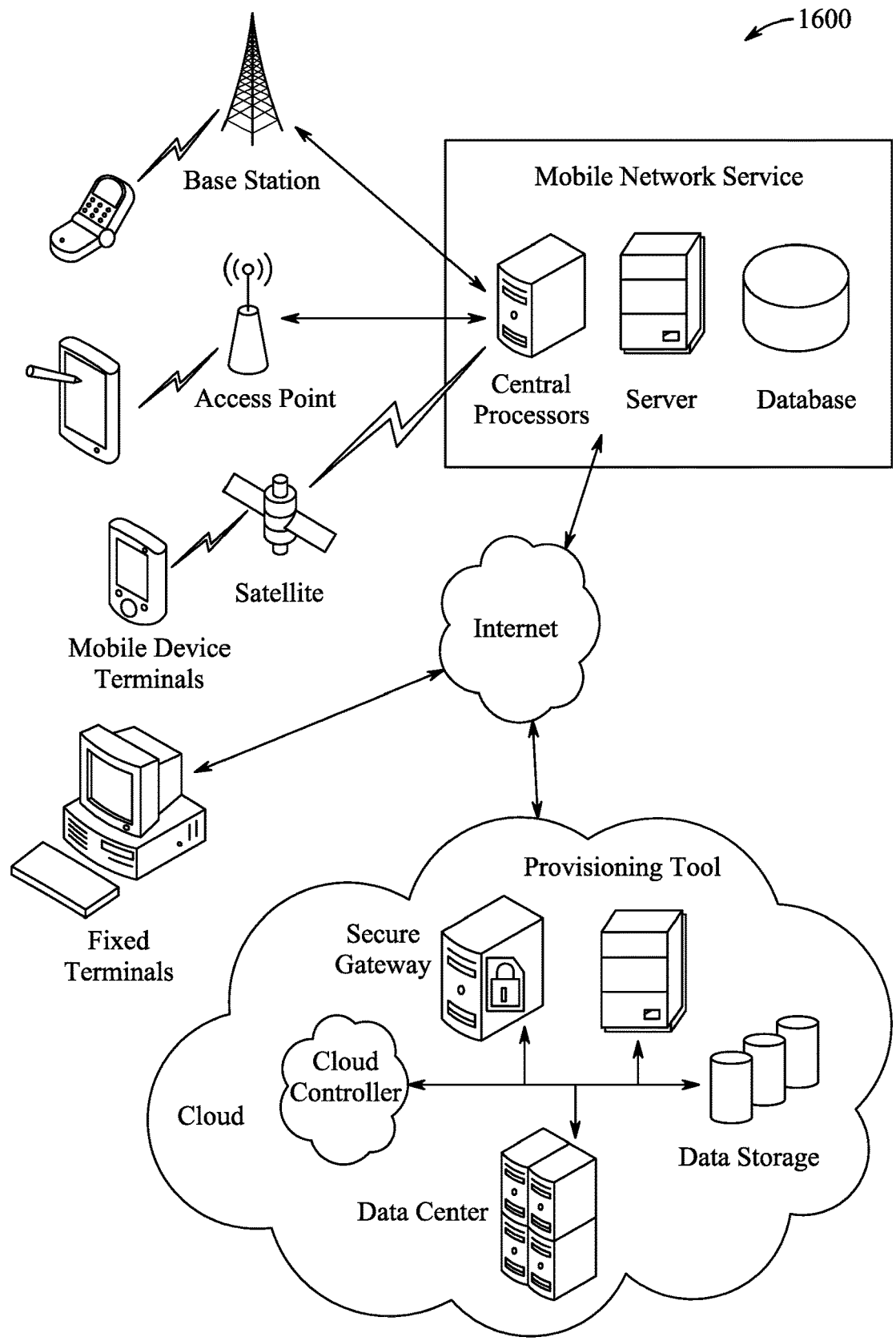
FIG. 16 is an illustration of a non-limiting example of distributed components which may share processing with the controller, according to certain embodiments.

The functions and features described herein may also be executed by various distributed components of a system, such as a system 1600 as shown in FIG. 16. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A multi-robotic U-shaped disassembly line, comprising:
  a U-shaped conveyor belt including an entrance end and an exit end, an entrance portion at the entrance end, a first portion connected to the entrance portion, a curved portion connected to the entrance portion, a second portion connected to an exit portion, wherein the entrance portion is configured to receive at least two components and the exit portion is configured to release disassembled parts of the at least two components;
  a plurality of robots, wherein each robot is configured to perform at least two disassembly tasks, wherein the plurality of robots includes at least two robots;
  a plurality of workstations, wherein each workstation is located along at least one of the first portion and the second portion, wherein each workstation includes at least two robots, wherein each robot is configured to rotate about a central axis to perform at least one disassembly task on the first portion and one disassembly task on the second portion;
  a plurality of tools, wherein each workstation includes at least one tool;
  a user interface configured to receive an input of a component number;
  an internal database configured with records comprising a plurality of component numbers and constituent part numbers for each component number;
  a computing device connected to the U-shaped conveyor belt, to each robot, to the user interface and to the internal database, the computing device including circuitry, at least one processor, and a memory comprising disassembly instructions for each component number, wherein the at least one processor is configured to execute the disassembly instructions to:
    receive, from the user interface, an input of a component number for each component located on the entrance portion of the U-shaped conveyor belt;
    retrieve, from the memory, at least one disassembly task for each component number;
    assign each disassembly task to a robot configured to perform the disassembly task;
    actuate the U-shaped conveyor belt to move the components past the workstations; and
    command each of the plurality of robots to use the at least one tool to perform at least one disassembly task upon at least one workstation as the components move to the workstation; and
  a sorter configured to receive the disassembled parts of the at least two components from the exit portion.

2. The multi-robotic U-shaped disassembly line of claim 1, wherein a length of each workstation is configured to hold up to three robots, wherein the robots are positioned such that:
  when there is only one robot at the workstation, the robot is positioned to face the middle of the length of the workstation;
  when there are two robots at the workstation, a first robot is positioned to face a center of a first half length of the workstation, and a second robot is positioned adjacent to the first robot to face a center of a second half length of the workstation;
  when there are three robots at the workstation, the first robot is positioned to face a center of a first one third length of the workstation, the second robot is positioned adjacent to the first robot to face a center of a second one third length of the workstation, and a third robot is positioned adjacent to the second robot to face a center of a third one third length of the workstation; and
  each robot is further positioned so as to face one side of the workstation located on the first portion and to face other side of the workstation located on the second portion after rotation about its central axis.

3. The multi-robotic U-shaped disassembly line of claim 2, wherein the computing device is configured to generate a set of drive signals which cause the U-shaped conveyor belt to move a component to a designated workstation for a cycle time and past each workstation from the entrance to the exit at a speed determined by the processor based on the disassembly instructions.

4. The multi-robotic U-shaped disassembly line of claim 3, wherein the disassembly instructions further include calculations for performing a multi-objective discrete brainstorming optimization, wherein the processor is configured to execute the calculations to:
  construct an AND/OR graph of the disassembly tasks for each component;
  construct a precedence and conflict matrix, P, of the disassembly tasks based on the AND/OR graph;
  construct a succession matrix, S, of the disassembly tasks, wherein the succession matrix, S, is configured to define a succession relationship of the disassembly tasks; and construct an incidence matrix, D, configured to model a relationship between each component part and each disassembly task and facilitate calculation of a profit of the disassembly.

5. The multi-robotic U-shaped disassembly line of claim 4, wherein the computing device is configured to wirelessly transmit the AND/OR graph, the precedence and conflict matrix P, the succession matrix S, and the incidence matrix D to a server, wherein the server is configured with an external database.

6. The multi-robotic U-shaped disassembly line of claim 5, wherein the processor is further configured to execute the calculations to:
generate an initial population of the disassembly tasks based on the precedence and conflict matrix, P, the succession matrix, S, and the incidence matrix, D;
apply a Pareto rule to the initial population and initialize an external archive set A stored in the external database;
cluster the initial population by a non-dominated sorting calculation;
generate a next population by using crossover and mutation operations;
update the next population by using a fast nondominated sorting (FNS) calculation and a crowding distance (CD) calculation; and
apply the Pareto rule and the crowding distance (CD) calculations to update the external archive set A.

7. The multi-robotic U-shaped disassembly line of claim 6, wherein the processor is further configured to execute the calculations to:
maximize a disassembly profit and minimize a smoothness index.

8. A method for disassembling components on a multi-robotic U-shaped disassembly line, comprising:
configuring an entrance portion of a U-shaped conveyor belt to receive at least two components;
configuring a user interface to receive an input of a component number;
configuring an internal database with records comprising a plurality of component numbers and constituent part numbers for each component number;
receiving, from the user interface, an input of a component number for each component located on the entrance portion of the U-shaped conveyor belt;
retrieving, from memory, at least one disassembly task for each component number;
assigning each disassembly task to a robot configured to perform the disassembly task;
disassembling the at least two components by at least two robots positioned at a plurality of workstations adjacent to the U-shaped conveyor belt, wherein each robot is configured to rotate about a central axis to perform at least one disassembly task at one side of the workstation on an entrance side of the U-shaped conveyor belt and one disassembly task on other side of the workstation at an exit side of the U-shaped conveyor belt;
configuring an exit portion of the U-shaped conveyor belt to release disassembled parts of the at least two components into a sorter.

9. The method of claim 8, further comprising:
receiving, from a user interface, an input of a component number for each component located at the entrance portion;
retrieving, by a computing device operatively connected to the U-shaped conveyor belt, the user interface and plurality of robots, the computing device including a circuitry, at least one processor, and a memory comprising disassembly instructions for each component number, wherein the processor is configured to execute the disassembly instructions, at least one disassembly task for each component number;
assigning, by the computing device, each disassembly task to a robot configured to perform the disassembly task;
actuating, by the computing device, the U-shaped conveyor belt to move the components past the workstations;
commanding, by the computing device, each of the plurality of robots to use at least one tool to perform at least one disassembly task upon at least one workstation as the components move to the workstation; and
releasing the disassembled parts of the at least two components into the sorter.

10. The method of claim 9, further comprising:
generating, by the computing device, a set of drive signals which cause the U-shaped conveyor belt to move a component to a designated workstation for a cycle time and past each workstation from the entrance to the exit at a speed determined by the processor based on the disassembly instructions.

11. The method of claim 10, further comprising:
constructing, by calculations included in the disassembly instructions for performing a multi-objective discrete brainstorming optimization, an AND/OR graph of the disassembly tasks for each component;
constructing a precedence and conflict matrix P of the disassembly tasks based on the AND/OR graph;
constructing a succession matrix S of the disassembly tasks, wherein the succession matrix, S, is configured to define a succession relationship of the disassembly tasks; and
constructing an incidence matrix D configured to model a relationship between each component part and each disassembly task and facilitate calculation of a profit of the disassembly.

12. The method of claim 11, further comprising:
wirelessly transmitting the AND/OR graph, the precedence and conflict matrix P, the succession matrix S, and the incidence matrix D, by a communications device located within the computing device, to a server configured with an external database.

13. The method of claim 12, further comprising:
generating, by the processor, an initial population of the disassembly tasks based on the precedence and conflict matrix, P, the succession matrix, S, and the incidence matrix, D;
applying a Pareto rule to the initial population and initialize an external archive set A stored in the external database;
clustering the initial population by a non-dominated sorting calculation;
generating a next population by using crossover and mutation operations;
updating the next population by using a fast nondominated sorting (FNS) calculation and a crowding distance (CD) calculation;
applying the Pareto rule and the crowding distance (CD) calculations; and
updating an external archive set A stored in the external database.

14. The method of claim 13, further comprising:
calculating, by the processor, the profit of the disassembly, calculating, by the processor, a smoothness index of the disassembly; and maximizing the profit of the disassembly and minimizing the smoothness index.

15. A non-transitory computer readable medium having disassembly instructions stored therein that, when executed by one or more processors, cause the one or more processors to perform a method for disassembling components on a multi-robotic U-shaped disassembly line, comprising:

configuring an entrance portion of a U-shaped conveyor belt to receive at least two components;

configuring a user interface to receive an input of a component number;

configuring an internal database with records comprising a plurality of component numbers and constituent part numbers for each component number;

receiving, from the user interface, an input of a component number for each component located on the entrance portion of the U-shaped conveyor belt;

retrieving, from memory, at least one disassembly task for each component number;

assigning each disassembly task to a robot configured to perform the disassembly task;

disassembling the at least two components by at least two robots positioned at a plurality of workstations adjacent to the U-shaped conveyor belt, wherein each robot is configured to rotate about a central axis to perform at least one disassembly task at one side of the workstation adjacent to a first portion of the U-shaped conveyor belt connected between the entrance portion and a curved portion of the U-shaped conveyor belt and to perform at least one disassembly task on a second portion of the workstation adjacent to an exit portion of the U-shaped conveyor belt;

configuring an exit portion of the U-shaped conveyor belt to release disassembled parts of the at least two components into a sorter.

16. The non-transitory computer readable medium method of claim 15, further comprising:

receiving, from a user interface, an input of a component number for each component located on the entrance portion of the U-shaped conveyor belt;

retrieving from the memory at least one disassembly task for each component number;

assigning each disassembly task to a robot configured to perform the disassembly task;

actuating the U-shaped conveyor belt to move the components past the workstations;

commanding each of the plurality of robots to use at least one tool to perform at least one disassembly task upon at least one workstation as the components move to the workstation; and releasing the disassembled parts of the at least two components into the sorter.

17. The non-transitory computer readable medium method of claim 16, further comprising:

generating a set of drive signals which cause the U-shaped conveyor belt to move a component to a designated workstation for a cycle time and past each workstation from the entrance portion to the exit portion at a speed determined by the processor based on the disassembly instructions.

18. The non-transitory computer readable medium method of claim 17, further comprising:

constructing, by calculations included in the disassembly instructions for performing a multi-objective discrete brainstorming optimization, an AND/OR graph of the disassembly tasks for each component;

constructing a precedence and conflict matrix P of the disassembly tasks based on the AND/OR graph;

constructing a succession matrix S of the disassembly tasks, wherein the succession matrix, S, is configured to define a succession relationship of the disassembly tasks; and constructing an incidence matrix D configured to model a relationship between each component part and each disassembly task and facilitate calculation of a profit of the disassembly.

19. The non-transitory computer readable medium method of claim 18, further comprising:

wirelessly transmitting the AND/OR graph, the precedence and conflict matrix P, the succession matrix S, and the incidence matrix D to a server configured with an external database.

20. The non-transitory computer readable medium method of claim 19, further comprising:

generating an initial population of the disassembly tasks based on the precedence and conflict matrix, P, the succession matrix, S, and the incidence matrix, D;

applying a Pareto rule to the initial population and initialize an external archive set A stored in the external database;

clustering the initial population by a non-dominated sorting calculation;

generating a next population by using crossover and mutation operations;

updating the next population by using a fast nondominated sorting (FNS) calculation and a crowding distance (CD) calculation;

applying the Pareto rule and the crowding distance (CD) calculations;

updating an external archive set A stored in the external database;

calculating the profit of the disassembly, calculating a smoothness index of the disassembly; and maximizing the profit of the disassembly and minimizing the smoothness index.

* * * * *